(12) United States Patent
Ziarno

(10) Patent No.: US 6,253,998 B1
(45) Date of Patent: Jul. 3, 2001

(54) FUND-RAISING TERMINAL AND METHOD FOR ACCEPTING MONETARY CONTRIBUTIONS BY USE OF AN INFORMATION BEARING CARD

(76) Inventor: Witold A. Ziarno, 4519 S. St. Louis Ave., Chicago, IL (US) 60632

(*) Notice: Subject to any disclaimer, the term of this patent is extended or adjusted under 35 U.S.C. 154(b) by 0 days.

(21) Appl. No.: 08/318,914

(22) Filed: Oct. 5, 1994

Related U.S. Application Data

(63) Continuation-in-part of application No. 08/199,072, filed on Feb. 28, 1994, now Pat. No. 5,506,393, which is a continuation-in-part of application No. 08/194,204, filed on Feb. 8, 1994, now abandoned, which is a continuation-in-part of application No. 08/127,770, filed on Sep. 28, 1993, now abandoned, which is a continuation-in-part of application No. 08/117,909, filed on Sep. 7, 1993, now abandoned.

(51) Int. Cl.$^7$ .................................................. G06K 5/00
(52) U.S. Cl. ................ 235/380; 235/462.45; 235/472.01
(58) Field of Search .................................. 235/380, 379, 235/462, 472, 462.45, 462.46, 472.01, 472.02

(56) References Cited

U.S. PATENT DOCUMENTS

| | | | | |
|---|---|---|---|---|
| 4,454,414 | * | 6/1984 | Benton ................................. | 235/379 |
| 5,055,660 | * | 10/1991 | Bertagna et al. .................... | 235/472 |
| 5,111,395 | * | 5/1992 | Smith et al. ........................ | 364/401 X |
| 5,177,342 | * | 1/1993 | Adams .............................. | 235/380 X |
| 5,206,488 | * | 4/1993 | Teicher .............................. | 235/380 |
| 5,221,838 | * | 6/1993 | Gutman et al. ...................... | 235/379 |
| 5,294,782 | * | 3/1994 | Kumar ............................... | 235/462 |
| 5,466,919 | * | 11/1995 | Hovakimian ......................... | 235/380 |

FOREIGN PATENT DOCUMENTS 2223872A    4/1990   (GB) .
WO93/14476  7/1993   (WO) .

* cited by examiner

Primary Examiner—Michael G Lee
(74) Attorney, Agent, or Firm—Witold A. Ziarno

(57) ABSTRACT

An electronic fund-raising monetary contributions terminal and a method of inducing and facilitating the solicitation and making of hundreds of monetary contributions with the terminal at fund-raising drives, fund-raising sessions and events attended by a large number of potential contributors including cardholders of card records constituting pre-authorization by card issuing organizations for monetary transactions using their card records such as credit cards and debit cards. The terminal is self-powered and has a housing in the form of a case dimensioned for being held on the palm of a contributor and passed from one contributor to another for making successively individual monetary contributions by a multiplicity of contributors using respective pre-authorization cards. A card reader is provided on the housing for reading indicia on the card records presented to it for making monetary contributions and identifying the individual cardholder making a corresponding contribution. The terminal has manually activated operators for designating and entering in the terminal numerical information of the monetary amount of the corresponding contributions made. The numerical information entered is immediately recorded and stored correlated with the corresponding contributor's identification indicia for future down-loading to a network for post-contribution processing of the information recorded.

23 Claims, 13 Drawing Sheets

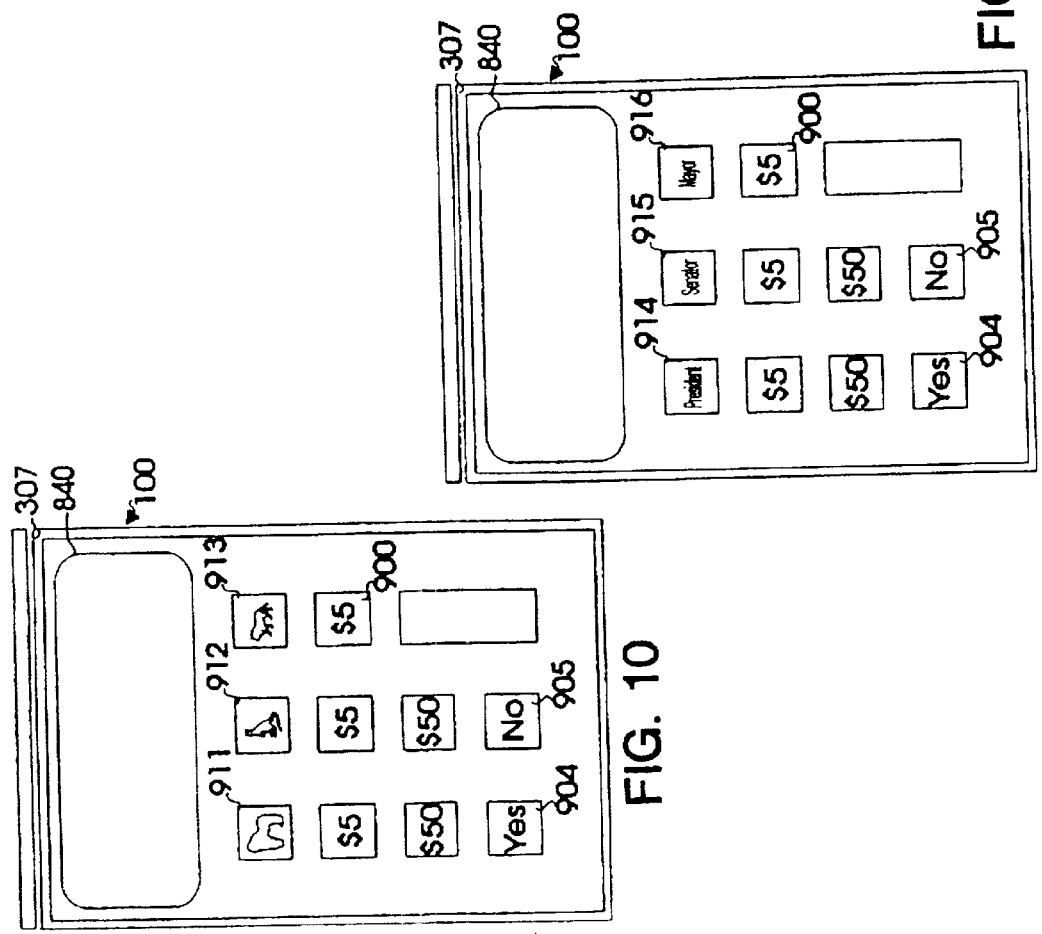

FUND-RAISING TERMINAL AND METHOD FOR ACCEPTING MONETARY CONTRIBUTIONS BY USE OF AN INFORMATION BEARING CARD

CROSS-REFERENCE TO RELATED APPLICATIONS

This application is a continuation-in-part of application of U.S. application Ser. No. 08/199,072, filed Feb. 28, 1994, now U.S. Pat. No. 5,506,393, which is a continuation-in-part application of U.S. application Ser. No. 08/194,204, filed Feb. 8, 1994, now abandoned, which is a continuation-in-part application of U.S. application Ser. No. 08/127,770, filed Sep. 28, 1993, now abandoned, which is a continuation-in-part of U.S. application Ser. No. 08/117,909, filed Sep. 7, 1993, by Witold A. Ziarno, now abandoned.

BACKGROUND

1. Technical Field

This invention relates generally to a fund-raising terminal for managing contributions; and, more particularly, it relates to a fund-raising electronic terminal that gathers credit card contributions, debit card contributions, and cash contributions, and accepts, stores, and displays visually numerical information regarding the monetary amount of a contribution. The invention provides a method of fund raising and providing substantiation for contributions made to fund raising organizations.

As is well known, fund-raising organizations are typically assisted in the solicitation of contributions through the use of pledges, and the like. A contributor is requested to make a pledge, and then later to honor the pledge by payment of the amount pledged. A problem with this type of fund-raising is that a number of pledges do not get honored. Some contributors forget about their pledge. Another problem is that when a pledge is solicited the contributor may not have his check book with him or may not have adequate cash on hand to make a contribution. Moreover, the contributor's financial situation may have changed between the making of a pledge and the honoring the pledge so that he no longer has adequate funds, even though the contributor had adequate funds available at the time a pledge was made. In any event, in such situations fund-raising organizations lose pledged contributions. If a contributor is a cardholder and wishes to make a contribution at a fund-raising event by way of an information bearing card, for example a credit or debit card, there maybe no terminals available for use by the contributor so that a contributor cannot make a contribution conveniently or rapidly.

Another possibility is that a fund-raising campaign may have a short time period allocated for the solicitation of contributions. Known information bearing card processing terminals require a procedure of verification of authorization of amounts of the contributions, validity of the cardholder's accounts, or identity of the cardholder made after each transaction and are thus too slow for passing the terminal from contributor to contributor as later herein described. Consequently, the known types of terminals do not allow a cardholder to make a contribution easily and readily. Consequently, due to the inconvenience a cardholder experiences he or she may be less likely to make a contribution. Moreover, these types of terminals do not allow a plurality of cardholders to sequentially make contributions rapidly during a time allocated to the contribution process to be practical. Interposing a verification of authorization step between each contribution transaction results in delay, that further inconveniences a group of contributors who are cardholders making them less likely to contribute by use of a credit card or debit card or any other information bearing card.

Known methods by which a contributor makes a contribution do not induce or facilitate the making of a contribution in that when approached by a fund-raiser, a contributor may not have cash on him to make a contribution. Moreover, a contributor may not have his check book with him. Hence, there is a high probability that the fund-raiser will not receive any contribution from an individual if that is the case. There exists a need for the making of a fund-raising terminal for contributions by cardholders and a method of fund raising that induces and facilitates the making of a contribution.

Furthermore, processing of contributions is costly and generally requires time and resources: to solicit a pledge on the part of a fund-raising organization, to have a contributor fill out a pledge card, to have the contributor honor the pledge, and considerable time and resources to process a pledge made by cash or check to get it into the fund-raising organization's account. Processing contributions also involves transaction costs or use of volunteers that include opening envelopes, counting cash contributions, segregating cash contributions, deposit costs associated with depositing cash into a fund-raising organization account, and the like. There exists a need for a quicker, less costly method and apparatus to solicit and manage contributions.

It would be highly desirable to solve the variety of problems enumerated above facing fund-raisers, and members of fund-raising organizations in soliciting contributions by way of information bearing cards.

It is an object of the present invention to provide a fund-raising method and fund-raising management terminal system that can collect, analyze, and display statistical information associated with a contribution or a plurality of respective contributions and provide useful quantitative data.

SUMMARY OF THE INVENTION

These and other objects of the present invention are achieved by a fund-raising management terminal and an fund-raising terminal network according to the invention. The present invention provides a fund-raising management terminal and fund-raising terminal network having a credit card processor, a debit card processor, or combination thereof, tallying of the amount of card contributions accepted, and collecting, analyzing, and displaying visually numerical information regarding the contributions. The present invention also provides a method of facilitating obtaining of a contribution, and a method of substantiating a contribution. These and other objects will become apparent in the course of a detailed description of the invention.

BRIEF DESCRIPTION OF THE DRAWINGS

FIG. 10 is a plan view of a face on a terminal for soliciting contributions for a plurality of fund-raising organizations, a plurality of causes within a fund-raising organization, or combination thereof;

FIG. 11 is a plan view of a face of a terminal for soliciting contributions for a plurality of political candidates;

FIG. 12 is a plan view of a face of a terminal for soliciting contributions for a fund-raising organization where there are multiple causes during each collection of contributions;

DETAILED DESCRIPTION OF THE PREFERRED EMBODIMENTS

Figure 1:
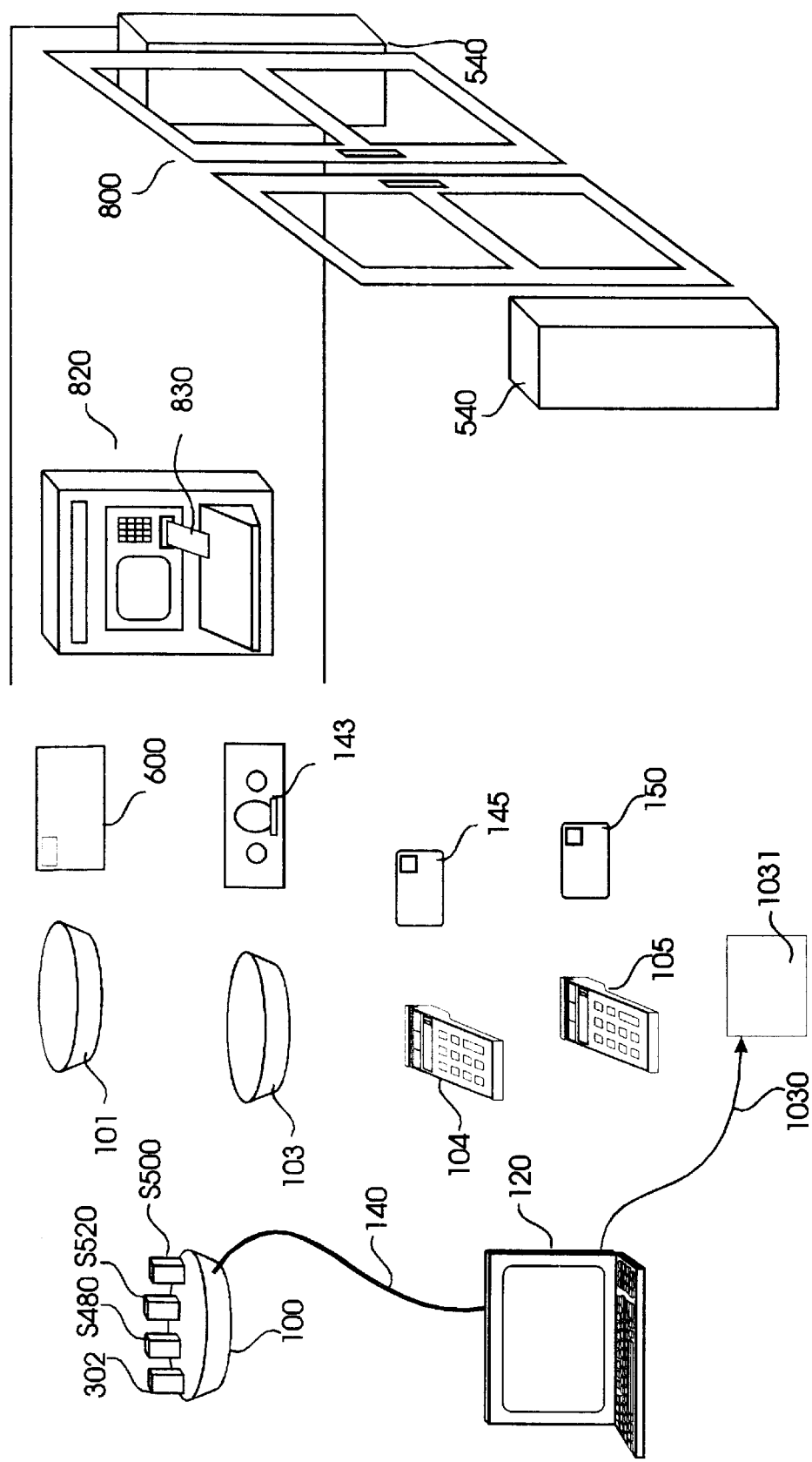
FIG. 1 is a diagram illustrating an overall system of a fund-raising management terminal network according to the present invention.

FIG. 1 illustrates an overall configuration of a fund-raising terminal network according to the present invention. A fund-raising terminal 100 is used by a fund-raiser at a fund-raising event or for the solicitation and receiving of contributions. Fund-raising events include charity balls, political fund-raising dinners, benefit concerts, sports events, door to door contribution solicitation, personal contribution solicitation, and the like.

A fund-raiser can include a charitable organization. A charitable organization generally is an organization that is awarded nonprofit status by the IRS, or other tax processing governmental body. Charitable organizations include non-profit tax exempt organizations that are classified under Section 501(c) (3) of the IRS Code. This classification is a reliable indicator of the tax deductibility of contributions. Charitable organizations defined under Section 501(c)(3) of the IRS Code are divided into two classes: public charities and private foundations. A public charity solicits funds from the public and uses the funds to sponsor or support social, educational, or religious activities, or engage in activities that provide for relief for distressed or underprivileged individuals. Public charities are defined in Section 509(a) (1–4) of the IRS Code.

Included in the group of charitable organizations are churches, conventions or associations of churches; educational organizations; hospitals and medical research organizations; organizations created to benefit state and municipal colleges and universities that normally receive their support from the government or the general public; and other publicly supported organizations such as museums, libraries, support groups for cultural organizations, organizations for the gathering of contributions for research into and the elimination of medical disorders, and organizations that provide direct services to the public.

Fund-raising organizations also include organizations that receive the majority of their support from activities relating to their tax exempt functions, such as a museum's receipts or tuition paid to an educational institute. Fund-raising organizations also include public television, radio, and other forms of media organizations that derive support from the public by way of contributions.

Fund-raising organizations also include those organized exclusively to support other qualified public charities, such as churches, schools, and hospitals; those operated for the purpose of testing products for public safety; and, private foundations established to maintain or aid social, educational, religious, or other charitable purposes.

A "fund-raiser" or "fund-raising organization" is a private foundation; a tax exempt corporation; a not-for-profit corporation; an organization organized and operated exclusively for religious, charitable, scientific, testing for public safety, literary, or educational purposes, to foster national or international amateur sports competition, and/or for the prevention of cruelty to children or animals; a civic league; an organization not organized for profit but operated exclusively for the promotion of social welfare; and, private for profit and not-for-profit organizations that gather a contribution on behalf the above mentioned organizations. Exemplary organizations may include the Red Cross, the Boy Scouts, the Girl Scouts, Salvation Army, American Heart Association, American Diabetes Association, United Way Crusade of Mercy, high schools, grammar schools, colleges, museums, and fund-raising arms of other organizations, the like.

A "fund-raising organization" and/or "fund-raiser" also includes a political organization, a party, committee, association, fund, or other organization (whether incorporated or not) organized and operated primarily for the purpose of directly or indirectly accepting a monetary contribution or making an expenditure, or both, for an "exempt function." An exempt function includes the function of influencing or attempting to influence the selection, nomination, election, or appointment of an individual to any Federal, State, or local public office or office in a political organization, or the election of Presidential or Vice-Presidential electors, whether or not such an individual or electors are selected, nominated, elected, or appointed; and, a campaign committee, and/or a fund established for the nomination or election of an individual to a Federal, State, or Public office.

A "fund-raiser" or "fund-raising organization" can also include an adhoc committee or organization created for the direct or indirect gathering of a monetary contribution for a charitable goal. It may include an organization or fund established for a humanitarian purpose such as raising resources for an organ transplant, for feeding or clothing needy people, and the like.

Figure 2:
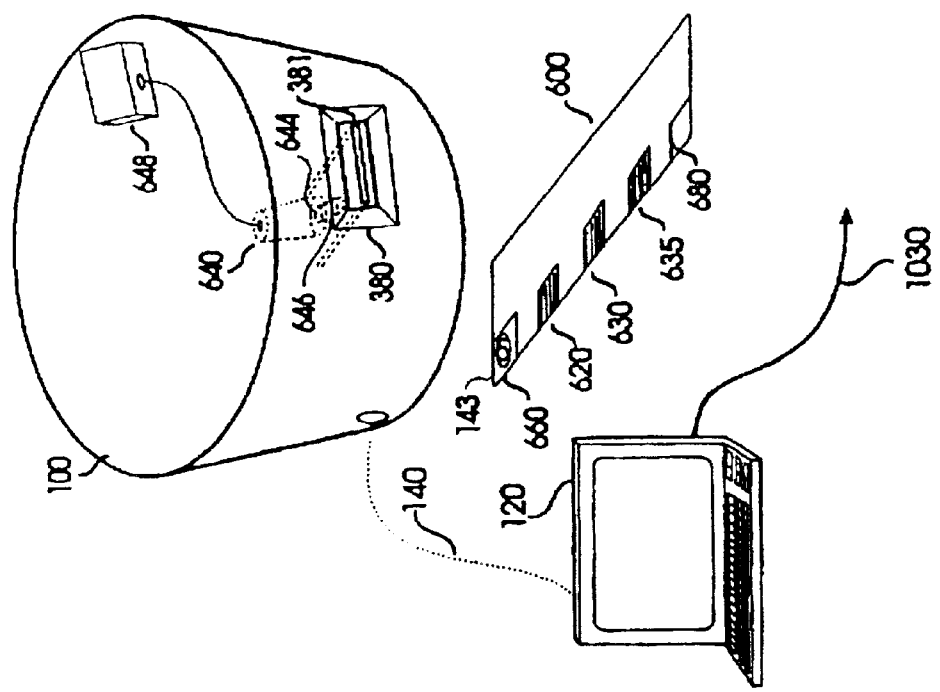
FIG. 2 is a perspective view of a bar coded envelope, an embodiment of a fund-raising terminal with an envelope contribution acceptor, and a fund-raiser's terminal.

As used herein, the term "fund-raising terminal" means an electronic device that is used to solicit and obtain contributions; the term "portable fund-raising terminal" means a hand-held device that is used to receive a monetary contribution, and is passed manually from one contributor to another contributor; and, the term "stationary fund-raising terminal" means a device that is used to receive a contribution and is mounted on or releasably fixed to a stationary object. In one embodiment of a portable, fund-raising terminal 101 receives an envelope 600 enclosing a contribution (FIGS. 1 and 2). In a second embodiment, portable fund-raising terminal 103 accepts a cash currency contribution 143. Fund-raising terminal 104 accepts a credit card 145 contribution. Another embodiment of a portable fund-raising terminal 105 accepts a debit card 150 contribution. The term fund-raising terminal 100 herein refers generally to the hand-held fund-raising terminals 101–105 inclusive.

Information bearing cards as referred to herein are used for making of a monetary contribution by a contributor who is a cardholder. An example of an information bearing card is a credit card including, credit cards issued by an organization. Such cards are: VISA, Mastercard, Discover, and an American Express cards. An information bearing card as used herein refers also to a debit card including, by way of example, a Cirrus card, a Plus card, a Maestro card, an Interlink card, and any other type of card that can be used for an electronic fund transfer. The term "card" also contemplates a private label card issued or maintained by a fund-raising organization or an affiliate of a fund-raising organization, and a prepaid card that can be purchased by cash, check, credit, or debit cards. An information bearing card can be a credit card, debit card, or combination thereof.

Figure 3:
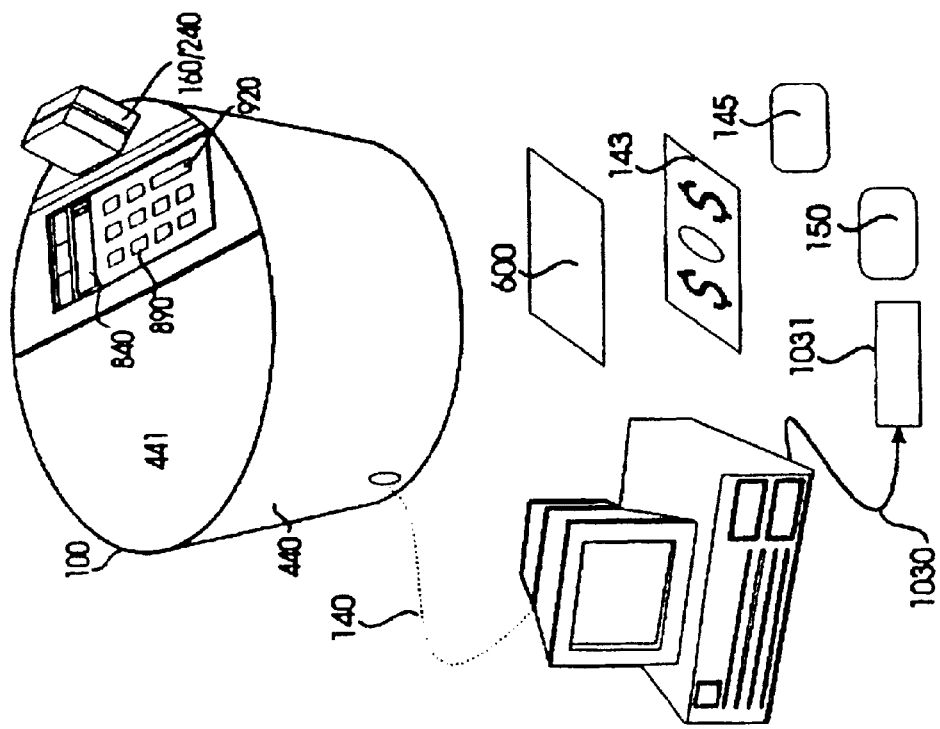
FIG. 3 is a perspective view of a fund-raising management terminal with a card processor, and capable of accepting cash, check, or envelope contributions.

Fund-raising terminal 100 of the type in FIG. 3 mounts a card processor 160/240 that processes contributions, and a card reader and accompanying circuitry that reads smart cards, e.g. PCMCIA cards, JEIDA/PCMCIA compliant memory cards, IC cards, GEC Card Technology LTd. IC cards, West Midlands, U.K. and/or Gemplus Card Services memory and microprocessor cards. The present invention contemplates the use of contactless IC cards, e.g. such as those available from Mitsubishi Electric UK Ltd., Hatfield UK, and Oakwood design, Letchworth UK, and the like. Other forms of information bearing cards are also usable with fund-raising terminal 100 embodiments.

The fund-raising management terminal 100, FIGS. 1 and 2, accepts a cash currency contribution 143, an envelope 600 containing a cash contribution, a credit card 145 contribution, and/or a debit card 150 contribution. Fund-raising terminal 100 collects, stores, and provides information about a contributor and a contribution. In the embodiment of FIG. 1, the fund-raising terminal 100 is a portable unit with a wire-less communication link 140. The fund-raising terminal 100 is a portable hand-held unit with a wire-less communication link 140. Using a communication link 140, preferably an RF (radio frequency) communication link, an infra-red communication link or other free-propagating electromagnetic energy communication link, the fund-raising terminal 100 communicates information about a contributor and the contribution to a fund-raiser's terminal 120 in the embodiment shown. As used herein, the term, "fund-raiser's terminal," refers to a terminal that can be used by personnel associated with a fund-raising organization, such as its business manager, a secretary, a clerk, a volunteer acting on behalf of the fund-raiser, or an accountant, etc.

In another embodiment, the fund-raising terminal 100 first stores the information about the contributor and the contribution or a plurality of contributors and their corresponding monetary contributions, e.g. each contributor's respective card information and respective information representative of a numerical monetary contribution amount for each respective contributor, it has accepted in a data storage 302, and then at a later time it can be off-loaded and communicated to fund-raiser's terminal 120 via communication circuitry 990 (FIG. 1a) and a communication link 140, e.g. after a single fund-raising event or after a full day of such fund-raising events. The fund-raiser's terminal 120 can be located on-site or at some remote location. The fund-raiser's terminal 120 communicates the information about the contributor and the contribution, or a plurality of contributors and their corresponding numerical contribution amounts, e.g. card information and information representative of a numerical monetary contribution amount for each respective contributor, via a communication link 1030, which by way of example, can be a telephone hookup, with a card account processor 1031, or the like. A card account processor can also be a funds processing telecommunications network, third party card processor, a bank, or a combination thereof. A card account processor can also be VISA Net, a merchant bank, a card processing bank or organization, or a combination thereof.

Figure 13:
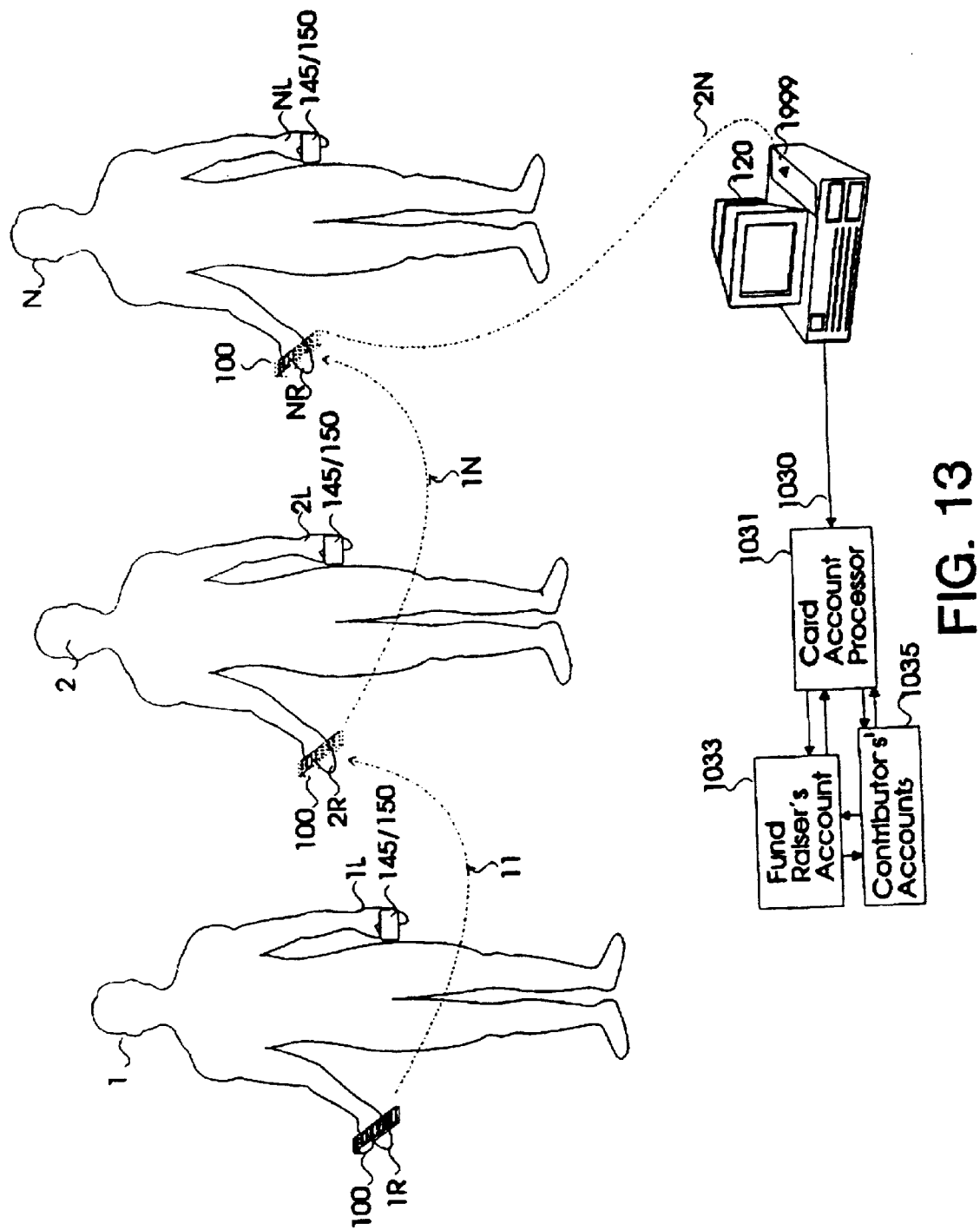
FIG. 13 is a diagram of a method of soliciting contributions for a fund-raising organization.
Figure 14:
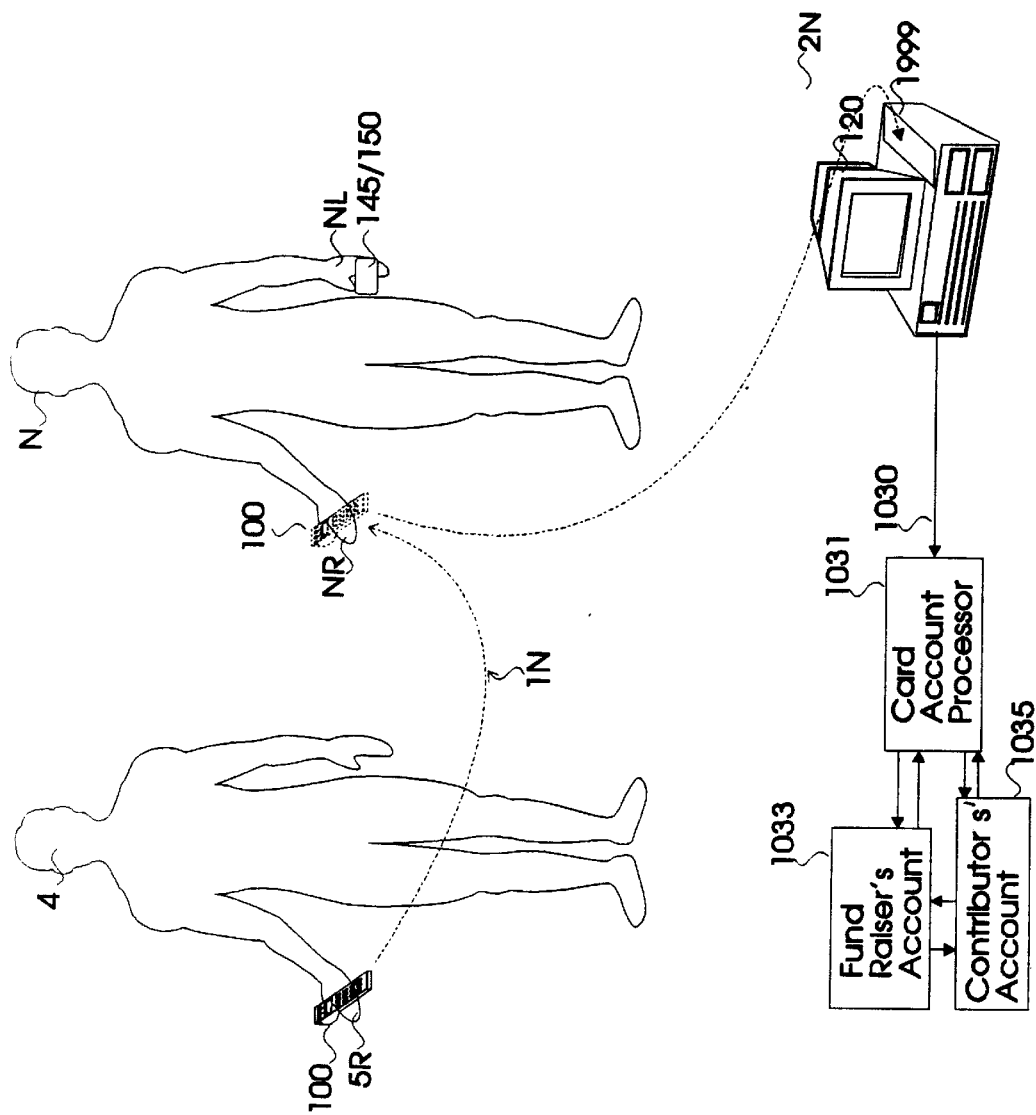
FIG. 14 is a diagram of another embodiment of the method of soliciting contributions illustrated in FIG. 13.

Such an embodiment of the fund-raising terminal 100 is hand-held and comprises a card reader 307, means for manually entering a monetary contribution amount, an optional visual display 840 for displaying numerical information of the amount entered, an on-board battery power source (preferably, a rechargeable battery power source) 1437, a data storage 302, and an optional program storage. Preferably the case of the fund raising terminal 100 is of a size and shape to easily fit into the palm of a contributor's hand. The contributor's thumb can rest on a side wall of the case of the terminal 100 and other fingers on the same hand can bear against a second side wall of an opposite side of the case of the terminal 100. This allows the contributor to easily hold the fund-raising terminal 100 in one hand. The size and shape of the terminal 100 also assists in the passing of the fund-raising terminal 100 from one contributor to another (FIG. 12). It will be further understood that the size and shape of the case of the hand-held terminal 100 further allows for the contributor to hold the terminal in one hand while being able to pass an information bearing card, for example a credit card or a debit card, with the contributor's other hand through a card reader on the terminal 100 (FIGS. 13 and 14).

An embodiment of fund-raising terminal 100 communicates information about a contributor, e.g. card information, and the contribution, e.g. numerical monetary amount information, or a plurality of contributors and their corresponding contributions, e.g. card information for each respective contributor and information representative of a numerical contribution monetary amount for each respective contributor, directly via a communication link 1030, for example, a telephone hookup, thereby bypassing the fund-raiser's terminal 120 to a funds processing database 1031, and the like. The card account 1035 of the contributor is appropriately charged the amount of the contribution, or debited for the contribution, as appropriate, and the account of the fund-raising organization 1033 is augmented respectively (FIGS. 13 and 14).

An example of a fund-raising terminal 100 optionally has a credit card processor 160, and/or a debit card contribution processor 240. Such a processor directly utilizes a cellular communication link, or other standard telephone hookup. The fund-raising terminal 100 stores a contributor's card account and contribution information in a data storage 302. After the fund-raising event or day (or a portion thereof) of soliciting contributions, a communication link 1030 is connected directly to a processor 160/240 and/or data storage 302, and communication circuitry 990 via a communication link 1030 transfers contributor and contribution information to a card account processor 1031, and the like. The card account of the contributor 1035 is appropriately charged or debited the amount of the contribution and the account of the fund-raising organization 1033 is augmented respectively (FIG. 13).

A contribution can be made on an off-line fund-raising terminal 100. The fund-raising terminal 100 does not interpose a request for an authorization or verification, an authorization step, pre-authorization step, verification step, or combination thereof, between the making of a contribution transaction made by a first contributor, and subsequent contribution transactions made by a plurality of subsequent contributors. In another embodiment of the method disclosed herein, the fund-raising terminal does not interpose a request for an authorization or verification, an authorization step, pre-authorization step, verification step, or combination thereof, between the making of a sub-group of contribution transactions within a group of contribution transactions (N) made by contributor$_1$ through contributor$_{n-1}$, e.g. at a single fund-raising event such as a dinner or the like. By way of example, there may be several hundred cardholder contribution transactions, e.g. N=500. Sequential contribution transactions are made by contributor 1 to contributor 500 prior to interposing a request for an authorization or verification, an authorization step, pre-authorization step, verification step, or combination thereof. In another variant, sequential contribution transactions are made by contributor 1 to contributor 500 prior to interposing a request for an authorization or verification, an authorization step, pre-authorization step, verification step, or combination thereof, between contribution transaction 10 and contribution transaction 11, contribution transactions (where n is an integer greater than 10) and contribution transaction$_{n+1}$, or combination thereof. Fund-raising terminal 100, fund-raiser's terminal 120, a card account processor 1031 (including a clearing organization and/or an issuing organization), fund-raising terminal network, or combination thereof, post contribution processes card information and contribution amount information. Post contribution processing may include a request for authorization or verification, an authorization step, pre-authorization step, verification step, or combination thereof. It will be understood that a plurality of sequential contributions made by a first contributor, a second contributor, and ... nth contributor can be made at a terminal 100 off-line before the information representative of the contributions, e.g. card information and numerical contribution amount information, is off-loaded from an off-line terminal 100 to card account processor 1031, fund-raiser's terminal 120, or combination thereof, for processing and authorization. It will be further understood that the speed with which several sequential contributions can be accepted from a large group of sequential contributors is greatly accelerated since a request for authorization or verification, an authorization, pre-authorization, verification step, or combination thereof, is not interposed between an entry of card information and entry of a numerical monetary contribution amount by each respective contributor.

By way of example, there may be several thousand prospective cardholder contributors at an event, e.g. a Papal Mass, a convention, at an out-door concert, zoo, the republican or democratic national convention, at an auditorium, at a church, at a church hall, an out door religious service, an outdoor fund-raising event at a national park, at a seminar, at a rally, at a banquet hall, etc. Fund-raising management terminal 100$_1$ through fund-raising management terminal 100 (where X is an integer) are circulated among the cardholding contributors, contribution transactions are made by respective cardholding contributors. Each respective fund-raising management terminal 100 can receive several hundred contribution transactions. Tens of hundreds of contribution transactions are received at one fund-raising event by fund-raising management terminals 100$_{1-X}$. These tens of hundreds of transactions are then off-loaded at the end of such an event from the fund-raising management terminals 100$_1$ to fund-raisers terminal 120 for further processing as described above. It will be seen that literally tens of hundreds of contribution transactions can be received from cardholder contributors in a single fund-raising event. The apparatus and method of the invention are highly efficient in receiving possibly tens of thousands of dollars of contributions within a single event, the event lasting a matter of hours.

The request for authorization or verification, authorization step, verification step, or combination thereof, is decoupled from each respective contribution transaction at the time the entry of a respective contributor's respective card information and contribution amount information is entered into a terminal 100.

It will be further understood that a plurality of contributions can be accepted in a short amount of time utilizing this procedure and that contributions that are later found to be unauthorized can be discarded and only authorized contributions are then credited to a fund raiser's account 1033 and debited to a contributor's account 1035. It is also possible to store the group of unauthorized transactions so that the contributors making these contribution transactions can be contacted to resubmit their respective contributions.

At or near an entrance or exit, as shown in FIG. 1, of a place of where a fund-raising event 800 is held, there can be located a receipt generator 820. The receipt generator 820 produces a receipt for an individual contribution or a plurality of respective individual contributions. The receipt 830 is used to substantiate a contribution. Substantiation may be required to receive a tax benefit from a governmental taxing authority, e.g. the Internal Revenue Service, or a state or local taxing or tax processing body.

A fund-raising terminal 100 can communicate via a communication link, preferably an RF (radio frequency) communication link or an infra-red communication link, with the receipt generator 820. The fund-raising terminal 100 can instead communicate contribution and contributor information, via a communication link to a fund-raiser's terminal 120. Fund-raiser's terminal 120 then communicates the contributor and contribution information to a receipt generator 820. The communication consists of information about the contributor, the contribution, the date, the special fund or intention for which the contribution was given, and the like. The communication consists of the same type of information wherein card information and contribution information is associated for each respective contributor where a large group of contributors makes contributions via a fund-raising management terminal 100 prior to transmitting the information to a card account processor 1031.

Upon receipt of the communication, the receipt generator 820 processes the information about the contributor and the contribution to generate a receipt 830. The receipt 830 may be generated automatically by the receipt generator 820 to be picked up by the contributor or attender of a fund-raising event after a fund-raising event or solicitation of a contribution, or may be generated at the request of the contributor or attender after the event as the contributor is leaving the place of contribution, or may be generated for mailing or faxing to the contributor or attender. A contributor may desire the receipt 830 for tax purposes or for determining if the contributor is meeting a contribution quota.

The present invention also contemplates locating the receipt generator 820 on a fund-raising terminal 100, and generating receipt 830 at fund-raising terminal 100.

In yet another embodiment of the method of the invention a record of the contribution is generated at a card account processor 1031, a bank, or combination thereof, and forwarded to a contributor. A receipt for a contribution appears on a contributor's monthly credit card statement, bank statement, or combination thereof, optionally, an annual, or after some other appropriate time period, a statement is forwarded to a respective contributor itemizing all contributions given, e.g. to charitable organizations, for tax purposes, or otherwise. The format of the statement can be such that a tax processing entity, e.g the IRS, will accept the information for substantiating the contribution or group of contributions at issue, and/or grant a charitable contribution deduction. It will be understood that records of the contribution transactions made by tens of hundreds of cardholder contributors can be easily be processed and forwarded to each respective contributor of the tens of hundreds contributors for meeting contribution quotas and for substantiating charitable contribution deductions and the like given at a plurality of fund-raising management terminals 100.

Security for fund-raising events is provided by a theft deterrent 540 located at or near an entrance or exit of a fund-raising event 800 to deter the theft of the fund-raising terminal 100. Theft deterrents are well known in the art. Security systems used in retail stores can be used, for example, the present invention contemplates that the fund-raising terminal 100 can contain a detectable element that can be detected by the theft deterrent 540. As such, if someone attempts to unlawfully take the fund-raising terminal 100 through an entrance or exit of a place of a fund-raising event 800 or past a sensor, an audible or visible alarm signal, or the like, will be generated. A homing device can be placed on the terminal to allow tracking of the terminal, e.g a system comparable to systems used to trace stolen automobiles.

The present invention includes provision for an optional tallier service routine S480, a set of software routines which run on a fund-raising terminal 100, fund-raiser's terminal 120, at a card account processor 1031, or combination thereof, to tally a plurality of contributions. In an alternate embodiment, service routine S480 is located within the fund-raiser's terminal 120. The service routine S480 tallies a credit card 145 contribution, a debit card 150 contribution, a cash contribution 143, an envelope 600 containing a cash contribution, and combinations thereof. Moreover, service routine S480 performs a number of arithmetic functions including but not limited to addition, subtraction, multiplication, division, as well as a statistical calculation. Service routine S480 is connectable to commercially available accounting programs in such is desired.

In conjunction with a printer, fund-raising terminal 100, fund-raiser's terminal 120, or combination thereof, can be used to generate a report commonly used for accounting purposes, including but not limited to a summary of total contributions generated, a monthly statement, a histogram, a contribution average per contributor, sub-group of contributors, or group of contributors.

Figure 1A:
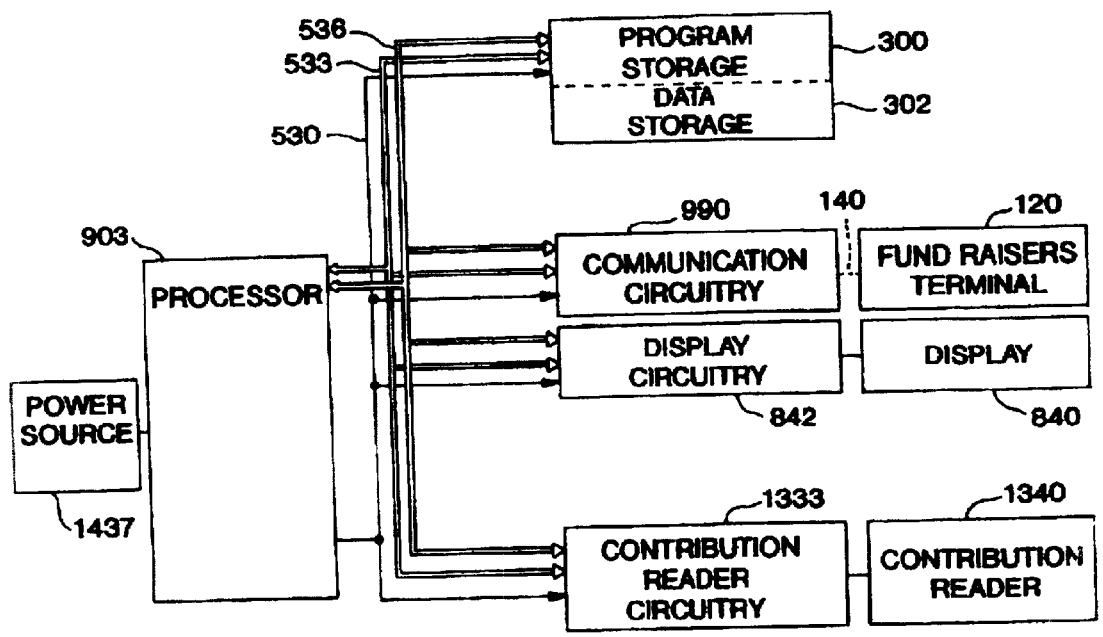
FIG. 1a is a general schematic block diagram of an embodiment of an exemplary fund-raising management terminal system according to the present invention.

The fund-raising terminal network of the present invention, which includes a hand-held fund-raising terminal 100, a fund-raiser's terminal 120, a card account processor 1031, or combination thereof, collects, analyzes, and visually displays statistical information associated with an individual contribution or a tally of individual contributions. The fund-raising terminal 100 contains an optional statistical information collecting routine S500, a set of software routines which run on processing circuitry 903 (FIG. 1a). In a variant, the statistical information collecting routine S500 is located in the fund-raiser's terminal 120. The statistical information collecting routine S500 collects contribution data from the contribution reader 1340 and associated circuitry 1333 (FIG. 1a), and communicates it to storage 302 (FIG. 1a). A statistical information analyzing routine S520, a set of software routines which run on a fund-raising terminal 100 located within the fund-raising terminal 100 in one embodiment, or in the fund-raiser's terminal 120 in an alternate embodiment, then retrieves contribution data from data storage 302 and performs arithmetic and statistical calculations thereon.

FIG. 1a is a general schematic block diagram of a fund-raising terminal of an embodiment of the present invention which includes a contribution reader 1340, contribution reader circuitry 1333, a power source 1437, and communication circuitry 990. Although display circuitry 842 is shown in this general embodiment of the invention, display 842 is optional.

In the present embodiment, processing circuitry 903 includes a microprocessor. However, a multiple microprocessors, or a plurality of dedicated microprocessors can also be used. Processing circuitry 903 and associated circuitry are powered through a power source 1437. Processing circuitry 903 interfaces with associated circuitry via an address bus 536, data bus 533, and a control bus 530. Specifically, upon detection by the contribution reader 1340 that a contribution is being made, the contribution reader circuitry 1333 interrupts the processing circuitry 903. The circuitry 903 responds to the interrupt by reading the buffered contribution information. Circuitry 903 then stores the contribution information in storage 302. In one embodiment, circuitry 903 also adds the new contribution information to a running total of contribution information stored in the storage 302. Terminal 120 can also have the same type of configuration as that described for as terminal 100 above.

A variety of links and associated circuitry are used in the present invention. By way of example, the link 140 is a serial link and associated circuitry in one embodiment, an RS-232 link and associated circuitry in another embodiment, modem circuitry in communication with the circuitry 990 in yet another embodiment, an RF or infra-red link and associated circuitry, or combination thereof.

A variety of additions, not shown, can be added to the embodiment of the processing circuitry 903 illustrated in FIG. 1a. By way of example, a currency reader and associated circuitry, a keyboard and associated circuitry, a touch sensitive screen and associated circuitry, a bar code reader and associated circuitry, an optical character recognition reader and associated circuitry, an electronic signature line and associated circuitry, a fingerprint scanner and associated circuitry, a card reader 307 and associated circuitry 309, a coin reader and associated currency, and a bill dispenser and associated currency, and combinations thereof can be added.

The fund-raiser's terminal 120 drives a printer in one embodiment to produce a hard copy of a report representing data or information sent to terminal 120 via the communication circuitry 990 located in a fund-raising terminal 100. In another embodiment, optional service routine S1200 (FIG. 1b), runs on processing circuitry 903 located in fund-raising terminal 100. Processing circuitry 903 communicates contributor and contribution information to communication circuitry 990 which drives a printer to print out data via a wired link, for example, an RS-232 cable. Similarly, fund-raising terminal 100 can use a serial link to drive a printer directly via communication circuitry 990.

Display circuitry 842 includes a buffer and LED drive circuitry which processing circuitry 903 can write information into in one embodiment. Display circuitry 842 responds to data written into the buffer by displaying that information via a control bus 530.

Contribution reader 1340 (FIG. 1a) and associated circuitry 1333 includes a credit card processor, a debit card processor, a currency validator, a currency discriminator, a currency acceptor, a coin discriminator, a coin validator, a bar code scanner, or a combination thereof.

Moreover, power source 1437 is a battery power source in one embodiment, and can be a portable rechargeable power source in another embodiment. Preferably, the battery is a rechargeable power source, and is located on the fund-raising terminal 100 so as to be easily accessible during replacement or recharging thereof. The power source 1437 can include a hardwired power supply. The present invention also contemplates use of a light responsive energy source such as a photo-cell. In such an embodiment, not shown, the battery life of terminal 100 can be enhanced in that energy is obtained from sources of light such as the sun or indoor lighting. The light responsive energy source can be used to supplement the power source 1437. In a variant, software routines on terminal 100 assist in conserving electrical energy from power source 1437 by deactivating the circuitry or portions thereof, e.g. the display, of terminal 100. circuitry of terminal 100 is reactivated once there is card information detected by reader 307 and associated circuitry, or combination thereof. In yet a further variant, a back-up power source is provided to power source 1437. In yet a further variant, contribution transaction data is semi-permanently stored for future off-loading in data storage 302 in the event there is a loss of power from power source 1437.

Figure 1B:
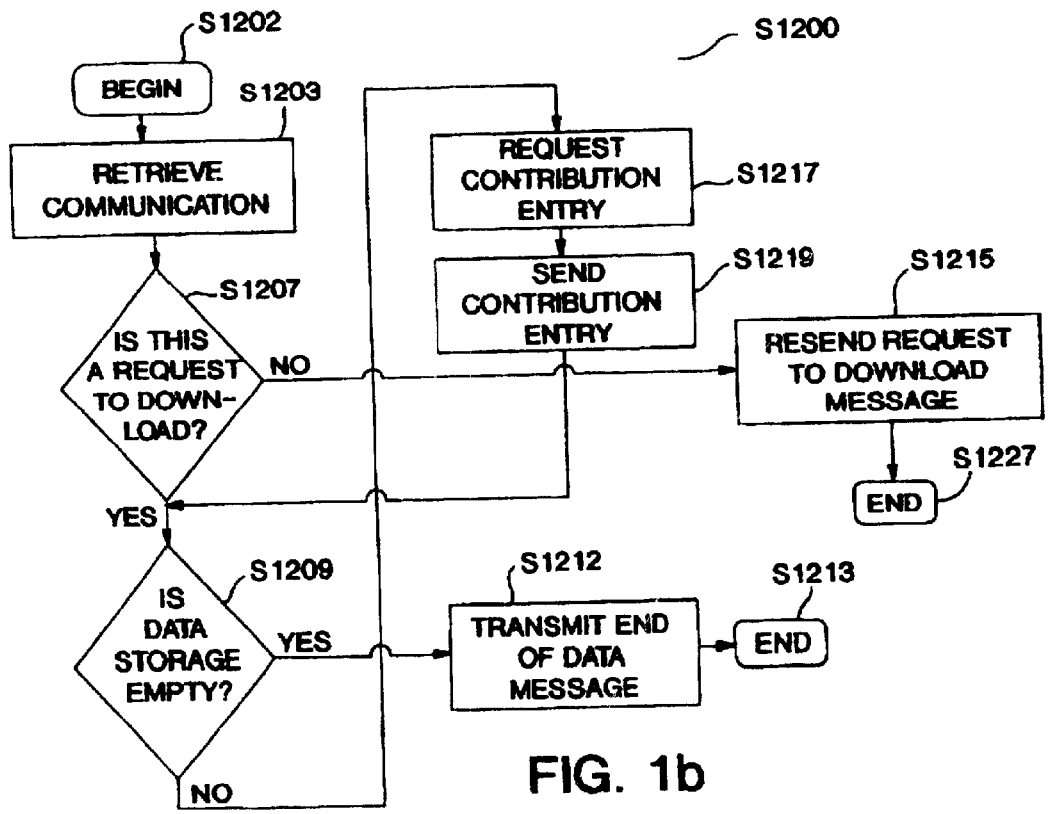
FIG. 1b is a flow chart illustrating the functionality of optional donation communication servicing software and associated hardware of an exemplary fund-raising management terminal according to the present invention.

FIG. 1b is a flow chart illustrating the functionality of an optional contribution communication servicing software and associated hardware of an exemplary fund-raising terminal of the present invention. Optional contribution communication circuitry servicing routine S1200 is a set of software programs which run on a fund-raising terminal 100. Routine S1200 is entered when a communication is received by communication circuitry 990 in one embodiment. Upon entering this routine (S1202), communication circuitry 990 enters a retrieve the communication routine S1203 to retrieve the communication. The communication consists of a request for contribution information in one embodiment. By way of example, the request includes a request for a cash contribution entry, an envelope contribution entry, a bar code data entry, a card entry, a contribution entry, or combinations thereof. The request can include a request for a fingerprint entry, a contribution entry, or a combination thereof. In another embodiment, the communication is a request to download. The circuitry 990 then tests to determine if this is a request to download by executing routine S1207. If "yes," then a test to determine if the data storage is empty using routine S1209 is conducted. If "yes," an end of data message using routine S1212 is sent, and routine S1200 is concluded (S1213).

If there was a "no" in response to routine S1207, routine S1215 is executed. Routine S1215 transmits a please resend request to download message, and then ends (S1227) routine S1200. The request to download can include a security code or other security information. Furthermore, the circuitry 990 may test to see if the proper security code is present within the request to download before downloading any information.

If there was a "no" in response to routine S1209, routine S1217 is executed to obtain the contribution entry. The contribution entry can come from the cash contribution acceptor 320, the envelope contribution acceptor, card contribution processor 160,240, or coin contribution acceptor 1100, or storage 302. Routine S1219 to send the contribution entry is entered. Routine S1219 loops around to routine S1209 until there is no more data to be communicated. Routine S1200 is entered when there is communication between fund-raising terminal 100 and fund-raiser's terminal 120 in one embodiment. In an alternate embodiment, routine S1200 is entered when there is communication between fund-raising terminal 100 and a printer. Provision can be made in another embodiment, routine S1200 is entered when there is communication with a card account processor, e.g. a third party card processor, a bank, VISA, and the like.

In an embodiment, a plurality of contribution data, comprising card information from an information bearing card and associated numerical contribution amount information, are grouped together. The grouped information is then transmitted to a card account processor. The card account processor authorizes a sub-group of contribution data for further processing. The authorized and unauthorized contribution data can be transmitted to a fund-raising terminal 100, fund-raiser's terminal 120, a fund-raising organization database, or combination thereof, for exclusion of the unauthorized contribution data. The unauthorized contribution data can be excluded if desired at a card account processor. The unauthorized contribution data are excluded from the group, and the authorized contribution data, e.g. card information and contribution amount information, are transmitted to the card account processor. Means responsive to information sent via a transferring means enters a debit representative of the contribution amount information to an account of the contributor. Means responsive to information sent via the transferring means enters a credit representative of the contribution amount information to an account of a fund-raising organization. The contribution data is further processed and a record of the contribution for substantiating a contribution is forwarded to a contributor.

Figure 1C:
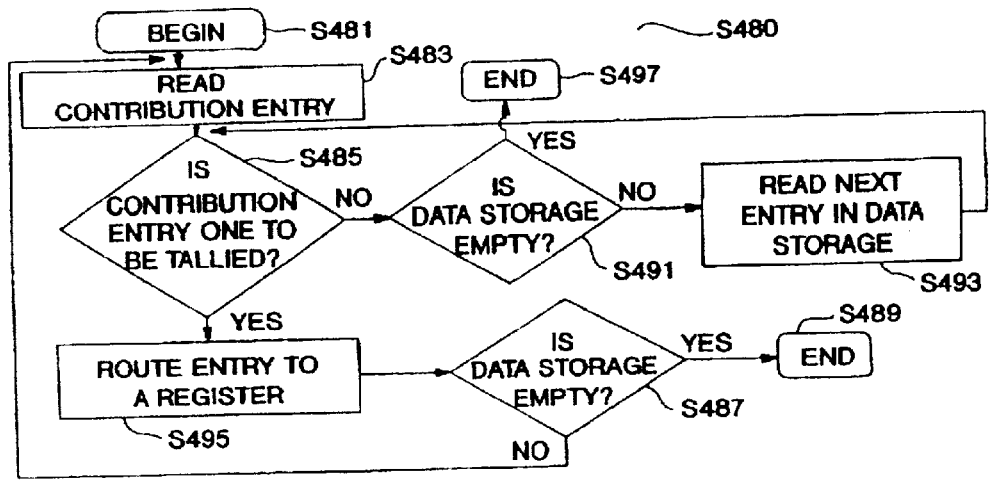
FIG. 1c is a flow chart illustrating the functionality of optional tallier servicing software and associated hardware of an exemplary fund-raising management terminal according to the present invention.

FIG. 1c is a flow chart illustrating the functionality of an optional tallier servicing routine S480 and associated hardware of an embodiment of a fund-raising terminal of the present invention. Routine S480 is entered (S481) in order to tally a plurality of contributions, which can be stored in the data storage 302 along with associated contributor information. An entry is read from storage 302 via routine S483. The entry is then tested to determine if the entry is a contribution to be tallied by a routine S485. Contributions that are tallied can include cash contributions 143, envelope contributions 600, credit card 145, and debit card 150 contributions. If a yes is given in response to the routine S485, then the entry is added to a register by routine S495. In one embodiment, routine S495 contains subroutines that pigeon hole a cash contribution 145 entry into one register, an envelope 600 contribution entry into another register, a credit card 145 contribution entry into yet another register, and a debit card 150 contribution entry into yet another register. Each respective register has a particular type of entry added, or a combination thereof, and then routine S487 is executed in one embodiment.

It is possible that there is only one register to which each type of entry is added, then routine S487 is executed. Routine S487 tests to determine if the data storage is empty or if the last data entry has been read. If yes, routine S480 ends (S489). If "no," there is a loop back and routine S483 reads the next entry. If "no" is the answer to routine S485, routine S491 tests to see if the data storage is empty. If "yes," routine S480 is concluded (S497). If "no," routine S493 reads the next entry in data storage 302 and loops back to routine S485.

Figure 1D:
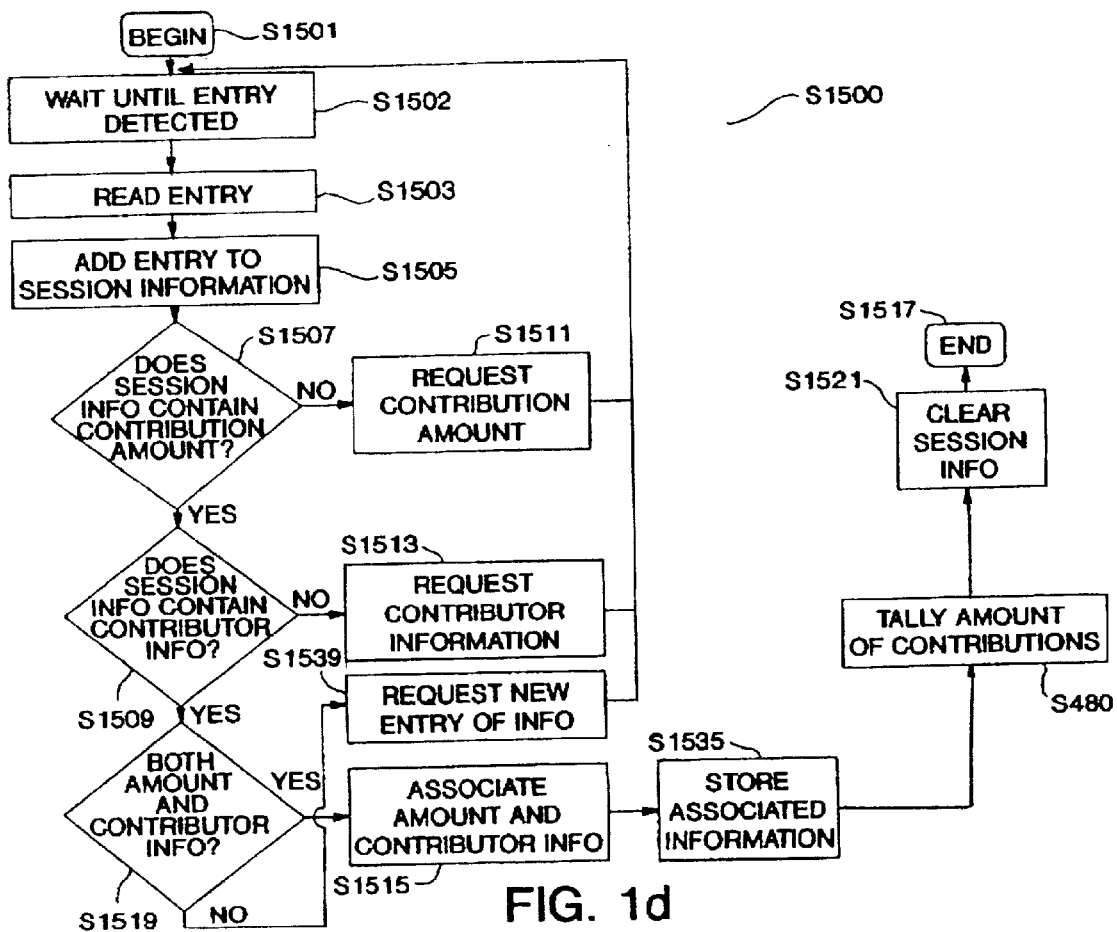
FIG. 1d is a flow chart illustrating the functionality of optional tallier servicing software and associated hardware for executing an optional donation session according the present invention.

FIG. 1d is a flow chart illustrating the functionality of optional software and associated hardware for executing a contribution session. For example, optional routine S1500 can be entered (S1501) whenever a contribution, or contributor information, is detected by contribution reader 1340 (FIG. 1a) by any other addition, e.g. keyboard 107 or a touch sensitive screen, or combinations thereof. Routine S1502 waits until an entry is detected by a reader or addition. Routine S1503 reads the entry. Routine S1505 adds the entry to session information. Routine S1507 tests to determine if the session information contains a contribution amount. Exemplary contribution amounts are a cash contribution 143 entry indicating the denomination of a bill, keyboard 107 entry indicating a contribution amount, a bar code 630 (FIG. 2) entry indicating a contribution amount, a coded envelope entry indicating a contribution amount, a coded card entry indicating a contribution amount, or a combination thereof. If no, routine S1511 requests a contribution amount and S1511 loops around to Routine S1502. In a variant, routine S1511 displays a message for a time out period. Routine S1511 can involve a single screen or multiple screen display depending on the type of entry device used. If the test of routine S1507 results in a "yes," routine S1509 is executed. Routine S1509 determines if the session information contains contributor information. By way of example contributor information includes a contributor bar code 620 (FIG. 2), a code associated with a contributor entered via keyboard 107, contributor information on a coded envelope, contributor information on a card, a fingerprint of a contributor, or a combination thereof. If "no, " routine S1513 requests contributor information and loops back to routine S1502. If "yes," Routine S1519 is executed and determines if the session information contains both contributor and contribution information. If "yes," routine S1515 associates the contributor and contribution information. In another variant, Routine S1535 stores the associated contributor and contribution information. In another variant, optional tallier service routine S480 is executed. Routine S1521 clears the session information. Routine S1500 ends (S1517). If the result of routine S1519 is "no," routine S1539 requests contribution amount and contributor information and loops back to before Routine S1502. Again, this routine may involve single or multiple screens depending on the input device. Provision can be made for optional service routine S480 to communicate information regarding the total amount of cash contributions 143 gathered via communication link 140, preferably an RF (radio frequency) communication link or an infra-red communication link, to the fund-raiser's terminal 120 for further processing as will be discussed below.

Where a keyboard (FIG. 4) is used, keyboard circuitry 109 scans keyboard 107 to determine if a key has been activated. Keyboard 107 refers to both keypad 890 and entry key 920, or combination thereof. Key board 107 might include a cancel key, and keys with other alpha-numeric text. The keyboard 107 can have a key that represents a specific denomination amount, e.g. five dollars ($5) or ten dollars ($10). Processing circuitry 903 interfaces with keyboard 107 and associated circuitry 109 via an address bus 536, data bus 533, and control bus 530. Once a key has been activated on the keyboard 107, that key information is moved into a buffer and interrupts the processing circuitry 903 to communicate that the key is ready. Circuitry 903 responds to the interrupt by reading the buffered keyboard information. Circuitry 903 then stores the keyboard information in a storage 302 if necessary. The keyboard information can consist of a contribution amount, an account number of a contributor, an authorization code, and the like.

FIG. 2 is a perspective view of an embodiment of an fund-raising terminal 100 with an envelope contribution acceptor 380. A contributor feeds an envelope 600 containing a cash contribution into a slot 381 of the envelope contribution acceptor 380. As used in relation to this embodiment the term "cash contribution" also includes a contribution by check. The envelope contribution acceptor 380 takes in the envelope 600 containing a cash currency contribution. This can be accomplished by pulling in envelope 600 containing a cash contribution in by a transport mechanism such as that commonly used in vending machines, and as previously described. Alternatively, a contributor may manually insert the envelope 600 containing a cash contribution through slot 381.

A contribution associator allows a contributor's account to be properly credited for the contribution. For example, the present invention contemplates that a contribution associator for associating an envelope containing a cash contribution with an account of a contributor may take on several forms, including but not limited to a bar code, e.g. 620 on the envelope, and bar code reader 640 and associated circuitry, an optical character recognition reader and associated circuitry, or a combination thereof. The present invention further contemplates that a reader that reads a coded envelope can be provided.

The envelope 600 containing a cash contribution can have thereon a contributor bar code 620 that is associated with information about a contributor's account. The envelope 600 containing a cash contribution may also contain a bar code representing a cash denomination 630, and/or a collection bar code 635. A collection bar code 635 is used to designate the specific collection to which a contribution is made if there are multiple collections during a religious service. The contributor bar code 620 can be associated with the contributor's account.

The fund-raising organization may choose to give a contributor an envelope containing only a contributor bar code 620 imprinted on the envelope 600. The present invention contemplates that the contributor can then add an adhesive label containing a bar code representing a cash denomination 630 to envelope 600. Moreover, on the occasion of a special gathering of contributions, a contributor can add an adhesive label containing a collection bar code 635 which can be affixed onto envelope 600. Other information can be associated with a bar code which can be affixed on an envelope 600.

If bar codes are used on an envelope 600, a bar code reader 640 reads the contributor bar code 620, and communicates information to bar code reader circuitry 648 where it is stored. A bar code reader 640 reads information from a collection bar code 635 and a bar code associated with a cash denomination 630. A bar code reader 640 and bar code reader circuitry 648 communicate this information to the fundraiser's terminal 120 via communication circuitry 990 and communication link 140 or to processor 903 for processing, e.g. via service routine S480. The fund-raiser's terminal 120 can communicate this information via a communication link 1030 to a central database where a plurality of contributions can be processed from individual fund-raising organizations.

Numerous bar code readers are commercially available from vendors. A bar code reader can be an ordinary pen-type bar code reader. Since the construction and operation of types of bar code readers are well known, a detailed description is omitted.

Although the exemplary described embodiment incorporates a pen type bar code reader, the fund-raising terminal 100 can incorporate any type of data gathering device equipped with a bar code reader.

Figure 5:
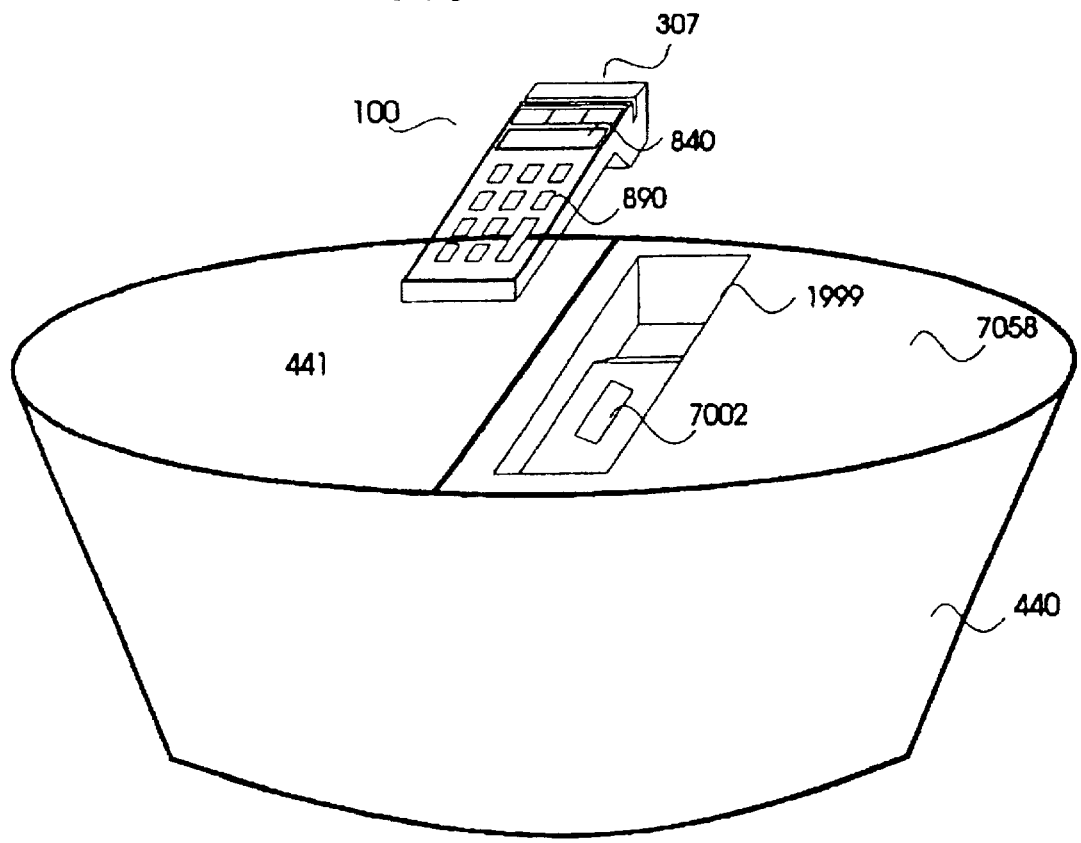
FIG. 5 is a perspective view of a hand held portable fund-raising terminal according to the invention.

FIGS. 3 and 5 are perspective views of embodiments of a fund-raising terminal 100 with a card processor. A card processor can be a credit card processor 160 and a debit card processor 240, e.g. processor 160/240. The present invention contemplates that fund-raising terminal 100 might only contain a credit card processor 160. Alternatively, the present invention also contemplates that a fund-raising terminal 100 can only contain a debit card processor 240. A variant embodiment can provide a credit card processor 160 and a debit card processor 240 can be located on fund-raising terminal 100 at different physical positions thereon.

A card processor 160/240 includes a card slot. A contributor swipes or passes a credit card 145 through the card slot of a credit card processor 160. Alternatively, a contributor swipes a debit card 150 through a card slot of a debit card processor 240.

In a preferred embodiment, fund-raising terminal 100 has both a credit card processor 160 and a debit card processor 240 utilizing a single processor that discriminates between the type of contribution made. An exemplary credit and debit card processor 160/240 is disclosed in U.S. Pat. No. 5,012,077.

The card processor 160/240 communicates with key pad 890 on the face of a hand-held terminal 100. Upon receiving the communication that a card contribution is to be given, the key pad 890 reveals a key associated with a cash denomination. By way of example, the key associated with a cash denomination can appear to disclose a one, five, ten or twenty dollar symbol as described below. The contributor presses the key associated with a cash denomination that is the preferred amount of his contribution, and presses entry key 920.

In a variant, a cardholder contributor passes his information bearing card 145/150 through card reader 307. Information regarding the type of card read is detected, e.g. a determination is made whether a premium card has been read such as a "GOLD CARD" versus some other type of card ("A CLASSIC CARD or VISA BUSINESS"), or whether other indicia regarding a contributor's credit worthiness, credit limits, or affluence are present. It will be appreciated that cardholders with high credit limits or bearing a premium card such as a gold card can be more affluent individuals tending to contribute larger contribution amounts. If a premium card is detected or if other information indicative of the cardholder's credit worthiness or affluence is detected, recommended contribution amounts appear on key pad 890. These recommended contribution amounts can be larger recommended contribution amounts. By way of example, when contributor$_A$ passes his information bearing credit card that is a VISAR GOLD Card through card reader 307. The information indicative of the type of card that contributor$_A$'s card is, is processed via software routines and a single or a plurality of recommended contribution amount keys appear on terminal 100's touch screen interface and/or display, e.g. $100, $150, $500. In a variant, when contributor$_B$ passes his information bearing credit card that is a VISA$^R$ CLASSIC Card through card reader 307. The information indicative of the type of card that contributor$_B$'s card is processed via software routines and a single or a plurality of recommended contribution amount keys appear on terminal 100's touch screen interface and/or display, e.g. $10, $15, $20. It will be seen that the cumulative amount of a group of respective contribution transactions that are received from a group of cardholder contributors in a single fund-raising event will be maximized utilizing this apparatus and method.

Most credit card 145 contribution amounts will not require an authorization by signature or numeric code. Consequently, the present invention contemplates that a contributor will simply need to swipe or insert an information bearing card 145/150 through, or into, the terminal 100, as required, and enter the amount of his contribution by pressing a key associated with a cash denomination in making his contribution on the key pad 890. The first contributor passes terminal 100 to a subsequent contributor who repeats the contribution step by depressing a key as to the amount given by him. The same steps are optionally performed by a plurality of contributors each choosing his or her monetary amount to be given. The card information and contribution information is then post processed. Post processing includes transmitting the card information and contribution information to a card account processor to request a verification or authorization, for crediting and debiting of the appropriate accounts, or combination thereof. The present invention contemplates that a contributor will have pre-authorized the fund-raising organization to collect a contribution amount. Pre-authorization can include an agreement with the organization that a contributor authorizes the contribution of a given amount once a certain action takes place, i.e. the contributor swipes card 145/150 through fund-raising terminal 100. The pre-authorized contribution amount and the contributor's card information are correlated, and forwarded to a card account processor for post-processing.

By way of further example, a contributor 1 (FIG. 13) enters into an arrangement with a fund-raising organization. The arrangement is that the fund-raising organization will associate a preferred contribution amount with the contributor's card information each time the contributor enters his respective card information into terminal 100. It will be appreciated that this method allows for contributor 1 to simply enter his card information in the terminal to make a contribution. Less time is spent by the contributor 1 focusing on the financial aspects of the transaction.

In the case of a debit card 150 contribution via a fund-raising terminal 100, the contributor can authorize the fund-raising organization to use a secret identification number associated with his debit card account in order to allow the organization to automatically obtain the contribution without seeking subsequent authorization from the contributor. Alternatively, the contributor may enter his personal identification number (PIN) into terminal 100, terminal 120, or combination thereof, and terminal 100, 120, or combination thereof, stores the PIN in an encrypted form for later processing. In this scenario, the contributor need only perform the action of swiping or inserting, as required, card 150 through processor 160/240 on fund-raising terminal 100 to make a contribution. The secret identification number is associated or correlated with the card information, contribution amount information, or combination thereof, and forwarded to a card account processor for post processing. In this scenario post processing includes obtaining appropriate authorizations, and crediting and debiting the contributor's account and the fund-raising organizations account, or combination thereof, as required.

The present invention also makes provision that a contributor need not to disclose a contributor's card 145/150 account authorization code to the fund-raising organization for security reasons but still may wish to make a card 145/150 contribution. In this case, the present invention contemplates that the fund-raiser's terminal 120, fund-raising terminal 100, or combination thereof, has an input 307 that allows for entry of the contributor's card 145/150 account authorization code so that it is encrypted and only decipherable and usable by the fund-raiser's terminal 120, fund-raising terminal 100, a card account processor, or combination thereof, for processing the card 145/150 contribution. An advantage of this feature is added security for the contributor. The present invention also contemplates using a touch sensitive screen, not shown, to input, a contributor's name, credit card and/or debit account information, the collection for which the contribution is made if there are multiple collections, and the like.

A single or a plurality of associated card 145,150 contributions is stored in data storage 302. A set of software routines associates or correlates a contributor's card account information with a contribution amount. The contributor has made a number of card contributions within a specified time period which are stored and tallied by a set of software routines. Optional small contribution service routine downloads a plurality of a contributor's card contributions once a card contribution amount threshold is reached.

The fund-raising terminal 100 can adopt pen-based input or touch sensitive screen input. A pen and screen provide a contributor a substitute for key pad 890. By way of example, a contributor may use a pen to write in the amount of contribution or other alpha-numeric text on a screen, not shown. Alternatively, a symbolic key associated with a cash denomination might appear on a screen. The contributor then uses a finger to touch the symbolic key associated with a cash denomination and designates the contribution amount. If a contributor's signature is required, a pen can also be used with a screen as an electronic signature line. The contributor's signature entered on a screen can be collected, stored, and/or transmitted by card processor 160/240 along with contribution information to a third party card processor via a communication link 1030. Alternatively, this information might be sent to fund-raiser's terminal 120 via a communication link 140 for further processing, storage, and/or transmittal via communication link 1030.

FIG. 3 is a perspective view of an embodiment of an fund-raising terminal 100 with a card reader 307. In a variant, a container 440 supports a credit card processor 160, a debit card processor 240, or combination thereof. The present invention contemplates that both a credit card processor 160 and a debit card processor 240 can be located on fund-raising terminal 100 at different physical locations.

A contributor can drop a cash contribution 143 or an envelope 600 containing a cash contribution into a container 440. Container 440 has an open area 441 on its top surface of a side surface. Area 441 is of a size for receiving a cash contribution 143 or envelope 600. The cash contribution 143 or envelope 600 containing a cash currency contribution might then be processed using manual post processed cash oblation. Alternatively, a contributor can make a contribution using credit card 145 or a debit card 150 as previously described.

The present invention contemplates that container 440 may be constructed from any material suitable to collect cash contributions or envelope contributions. Preferably, container 440 is constructed from a woven material, or a metal. Container 440 is of a size and weight permitting a contributor pass it and the terminal 100 to another contributor.

Figure 9:
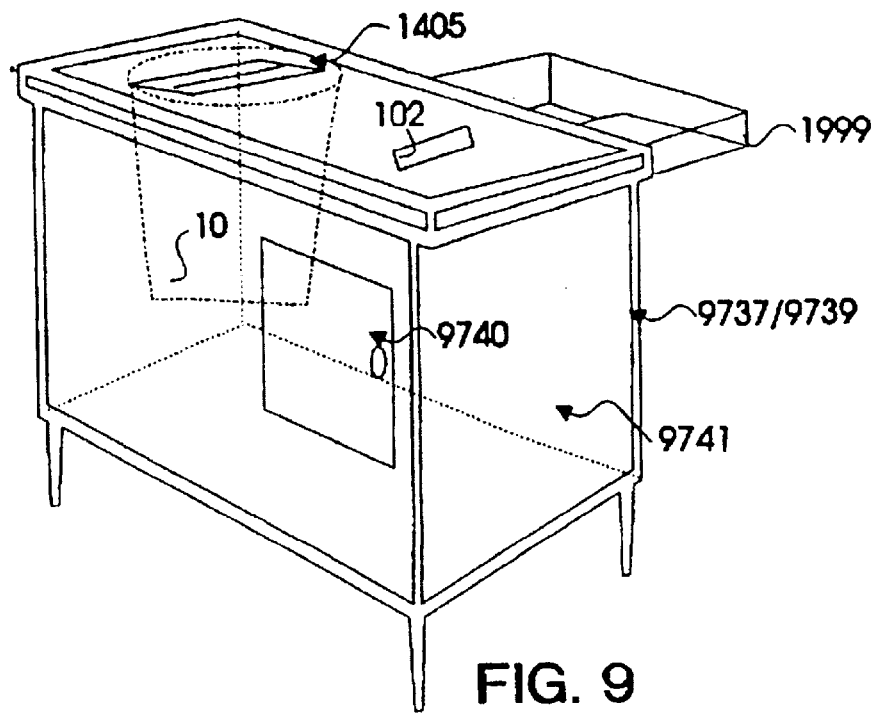
FIG. 9 is a perspective view of an envelope/deposit box.

Container 440 can comprise an envelope box 9737 with a locking cash drawer 9740 or a deposit box 9739 (FIG. 9). The envelope box 9737 and deposit box 9739 have a slot 102 disposed thereon for the deposit of cash 143 and envelope contributions 600 and an inner storage volume 9741. Deposit box 9739 can have the addition of an opening baffle 1405 for security, a locked cabinet door 9740 for access said cash contributions, and a removable bag 10 for retaining a cash contribution 143 (not shown). In one embodiment, envelope box 9737 and deposit box 9739 comprise docking station 1999, a fund-raising terminal 100, or combination thereof. Optionally, envelope box 9737 and deposit box 9739 comprise a lock means for lockably securing fund-raising terminal 100 thereto. The combination of envelope box and fund-raising terminal 100, and/or deposit box and fund-raising terminal 100 are optionally on an a fund-raising terminal network.

Figure 4:
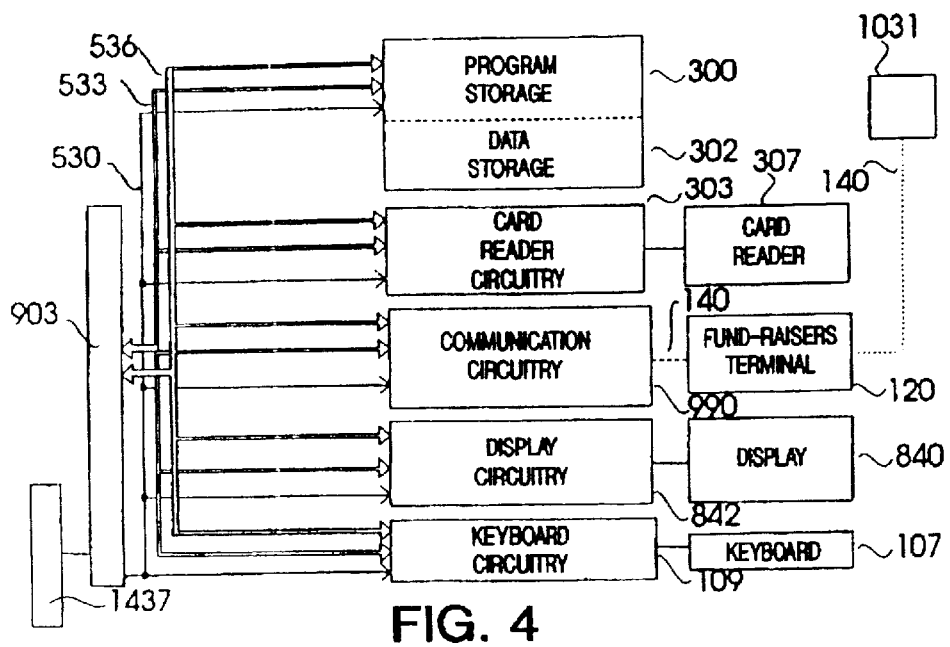
FIG. 4 is a schematic block diagram of a fund-raising contributions management terminal with various additions.

FIG. 4 is a schematic block diagram of a fund-raising terminal of the present invention, a card reader 307 and related circuitry 303 addition, and a key board 107 and related circuitry 109 addition. In this embodiment, fund-raising terminal 100 acts as a stand alone unit for accepting card 145, 150, cash 143, envelope 600 contributions, or combinations thereof. For example, in FIG. 3 communication link can be a wireless communication link. Further, in one embodiment, data storage 302 stores in the range of 10 to 1000+ contribution transactions, including card information and associated contribution information, the particular storage requirements being dictated by the number of contributors expected to use fund-raising terminal 100. Preferably, data storage can store approximately 200 transactions.

The present invention also contemplates that in other embodiments swiping a credit card 145 or debit card 150 might not be required. As used herein, the term "swiping" or "passing" refers to any method for communicating information on an information bearing card to a card reader 307. The invention has the features enumerated above in FIG. 1, with the addition of a receipt generator 820 at fund-raising terminal 100.

A contributor may wish to obtain a receipt 830 directly after he has made a contribution. After entering his contribution, a cash contribution 143, display 840 displays a message asking the contributor if he wishes a receipt for his contribution. The contributor presses a key representing yes on keypad 890. Receipt generator 820 prints receipt 830 for the contributor. The receipt contains information stored initially in the terminal 100, e.g. the contributor's name, the amount of the contribution, the date of the contribution, and/or the collection for which the contribution was given.

Figure 8:
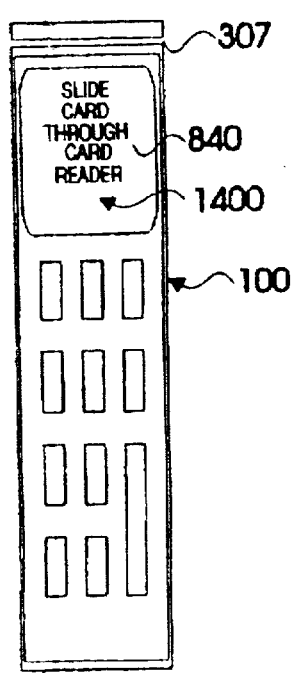
FIGS. 8, 8a and 8b are top plan views of terminals having various prompts for use with the corresponding fund-raising management terminal.
Figure 8A:
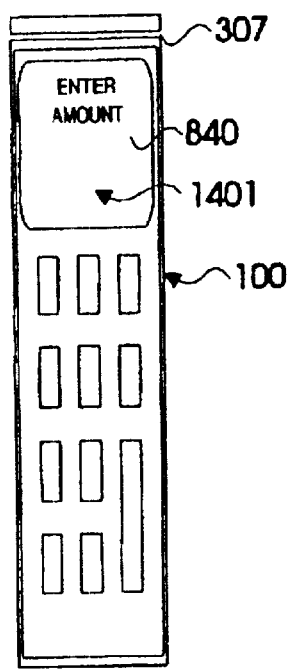
Figure 8B:
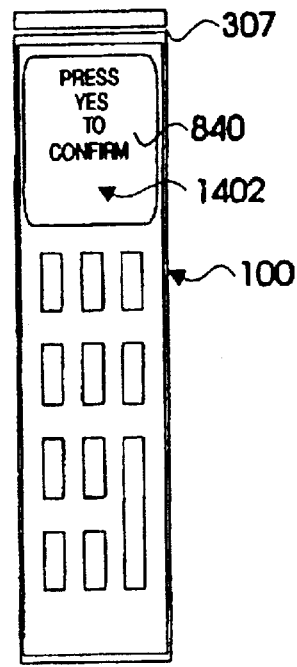

As shown in FIGS. 8, 8a, and 8b, fund-raising terminal 100 is used to induce, facilitate, and solicit a monetary contribution. The contribution is made by an information bearing card, e.g. such as a credit card 145, or debit card 150. A method comprises the steps of prompting a cardholder contributor to pass his information bearing card, e.g. through a card reader 307; prompting a contributor to manually enter information representative of a contribution amount; and, optionally prompting the contributor to verify information representative of a contribution amount. Verification may include a prompt to press a key representative of a "YES," "NO," "ENTER," or other type of key(s). Prompting is accomplished by visually displaying an alpha-numeric message on display 840. Optionally prompting may be accomplished by providing alpha-numeric text disposed on fund-raising terminal 100, offering station 7000, or combination thereof. Further optional visual prompts may include a prompt appearing on a display 840 requesting additional identification information of a contributor, e.g. the address of a contributor, a prompt requesting a special intention, or combination thereof. Further an optional message prompt may include the following text portions: "SLIDE CARD THROUGH CARD READER 1400," "ENTER Contribution AMOUNT 1401," "PRESS YES 1402," "ENTER OFFERING AMOUNT," "ENTER CONTRIBUTION," a variation on the themes of the text, or combination thereof. In a variant, terminal 100 audibly prompts a contributor to make a contribution by way of an information bearing card.

FIG. 5 is a perspective view of a portable fund-raising terminal 100, a docking station 1999 for portable fund-raising terminal 100, and a container 440 for gathering cash and envelope contributions.

Docking station 1999 allows for a fund-raising terminal 100 to be docked or received therein. Fund-raising terminal 100 is disposed in the docking station 1999 to allow information from an information bearing card and/or contribution amount information to be transmitted via docking station 1999 to, by way of example, terminal 120 (via communication link 140), to a card account processor 1031 directly via communication link 140 (FIG. 4), to another fund-raising terminal 100, or a combination thereof. It is possible to have a plurality of docking stations 1999 networked on an fund-raising terminal network.

Docking station 1999 can also be used to communicatively dispose a card reader 307, related circuitry 303 (FIG. 4), means for entering a contribution amount, means for storing contribution amount information, means for storing card information from an information bearing card, means for transmitting information from a fund-raising terminal, or combination thereof, to a container 440 (FIGS. 5 and 9) for collecting cash contributions, envelope contributions, or combination thereof. Moreover, a fund-raising terminal 100 or docking station 1999 may also be located on the interior or exterior of a building and/or a permanently mounted to an envelope collection box (FIG. 9). In such an embodiment, docking station 1999 provides a means for energizing fund-raising terminal 100. Optionally, docking station 1999 has a port 7778 for recharging a power supply on fund-raising terminal 100. Port 7778 is optionally used for communicatively attaching fund-raising terminal 100 to a fund-raising terminal network, where the fund-raising terminal network facilitates that transmittal of contribution information and card information to a card account processor.

Figure 6:
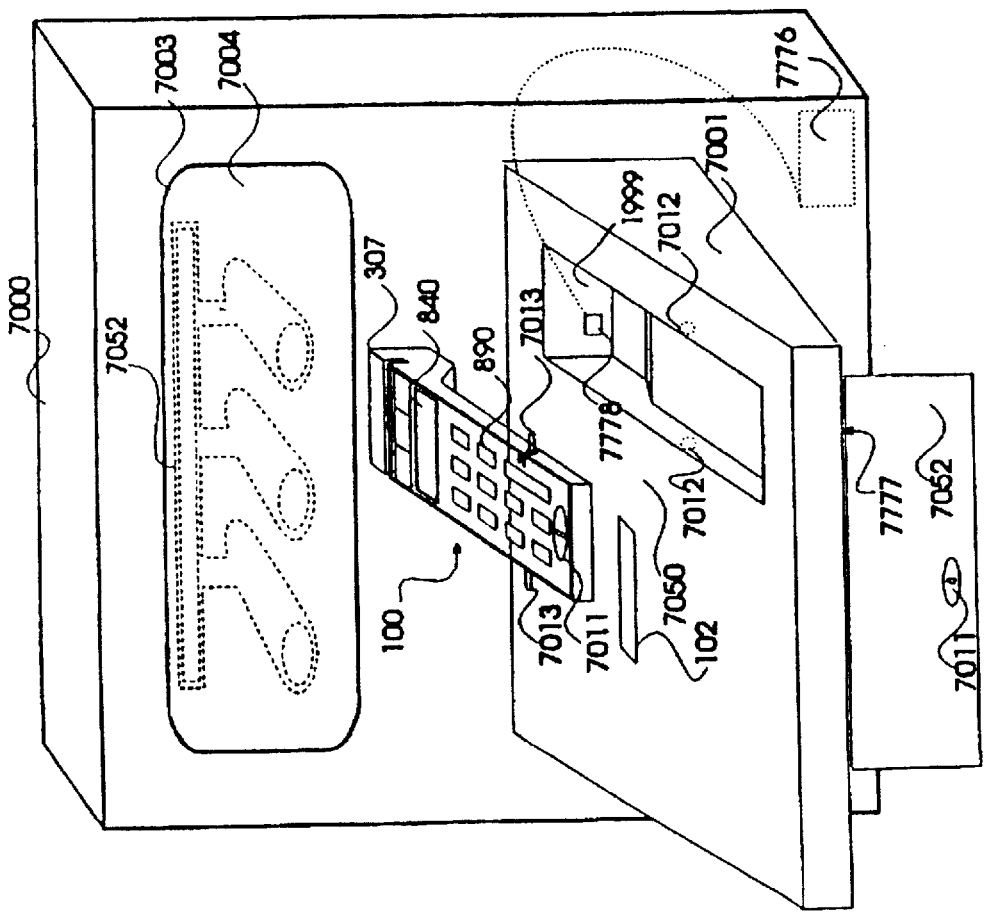
FIG. 6 is a perspective view of another embodiment of a portable fund-raising terminal.

In another embodiment docking station 1999 includes a slide in mounting unit (not pictured) onto which fund-raising terminal 100 is connected to container 440 (FIG. 5) or offering station 7000 (FIG. 6). In an embodiment, fund-raising terminal 100 slides into docking station 1999 (FIGS. 5 or 6), and plugs into the docking station 1999, e.g. into port 7778 (FIG. 6). In an alternate embodiment, docking station 1999, and/or fund-raising terminal 100 contain a base mount (not shown). The base mount includes a plate on the bottom or side of fund-raising terminal 100. The plate is offset from the bottom of fund-raising terminal 100. The plate allows fund-raising terminal 100 to slide into docking station 1999.

In a variant, fund-raising terminal 100 is permanently mounted in a docking station 1999. Optionally, docking station 1999 has a surface 7058 (FIG. 5) or surface 7050 (FIG. 6) on which a portable card processor 160/240 rests without an electrical connection. Fund-raising terminal is taken from the docking station 1999 surface 7050, 7058 after a plurality of contribution transactions, e.g. 10 to 1000+, and linked to a card account processor database 1031 via communication link 140. In one embodiment, docking station 1999 can be integrally molded into the body of container 440. The docking station 1999 comprises an optional indentation of a size and shape to retain fund-raising terminal 100 on a surface 7058, container 440, or a combination thereof. The fund-raising terminal 100, and docking station 1999 contain complementary electrical connectors (not shown), the connection of which provides sufficient connection to provide a communication link to transmit data or information. Numerous communication links discussed above can also be used to provide connections to move data.

In various embodiments, docking station 1999, terminal 120, fund-raising terminal 100, card account processor 1031, or a combination thereof, are on the same network. Downloading information from the devices on the network is directed to a terminal 120 in one embodiment, to a modem in another embodiment, or to a card account processor database in yet another embodiment. Docking station 1999 (FIGS. 5 and 6) is constructed of plastic, metal, wood, or any other material appropriate to create a surface on which a fund-raising terminal 100 can rest. Docking station 1999 is fastened to the side of container 440 via a fastening means (not pictured). By way of example, a fastening means includes adhesive, rivets, snaps, velcro, screws, or combination thereof.

Optional hook and loop fastener 7002 comes into contact with a sister hook and loop fastener (not pictured) disposed on the underside of fund-raising terminal 100 to releaseably connect fund-raising terminal 100 to docking station 1999 (FIGS. 5 and 6), surface 7058 (FIG. 5), or surface 7050 (FIG. 6).

FIG. 6 is a perspective view of an fund-raising contribution station 7000 comprising fund-raising terminal 100, optional docking station 1999, optional container 7001 for collecting cash and envelope contributions, and an optional means for lockably securing a fund-raising terminal 100 to docking station 1999, or surface 7050.

Fund-raising contribution station 7000 has a surface 7050. The fund-raising contribution station has optional aperture 7003 through which light source 7052 radiates light. Lens 7004 is interposed between the aperture 7003 and source 7052. Lens 7004 has alpha-numeric text disposed thereon in one embodiment, e.g. the name of a fund-raising organization. Fund-raising terminal 100 rests on surface 7050 removably attached with a hook and loop fastener as described in FIG. 5 or lockably disposed in docking station 1999 by way of a locking mechanism 7011. Pins 7013 retract or enter apertures 7012 in response to locking mechanism 7011 being locked or unlocked. A variety of locking mechanisms and assemblies for lockably securing fund-raising terminal 100 are known in the art. The present invention contemplates that fund-raising terminal 100 is optionally lockably disposed on the surface 7050. These locking assemblies may be used when fund-raising terminal 100 is secured to the container 440 (FIG. 5), an envelope collection container (FIG. 8) or combination thereof. Mechanical and electronic locking assemblies are used to lockably secure fund-raising terminal 100. These may include a lock and key combinations, padlocks, and the like. Port 7778 is used with a complimentary port on a fund-raising contribution station 100, a communication link 140, or combination thereof, to energize fund-raising terminal 100 via the optional power supply 7776.

Figure 7:
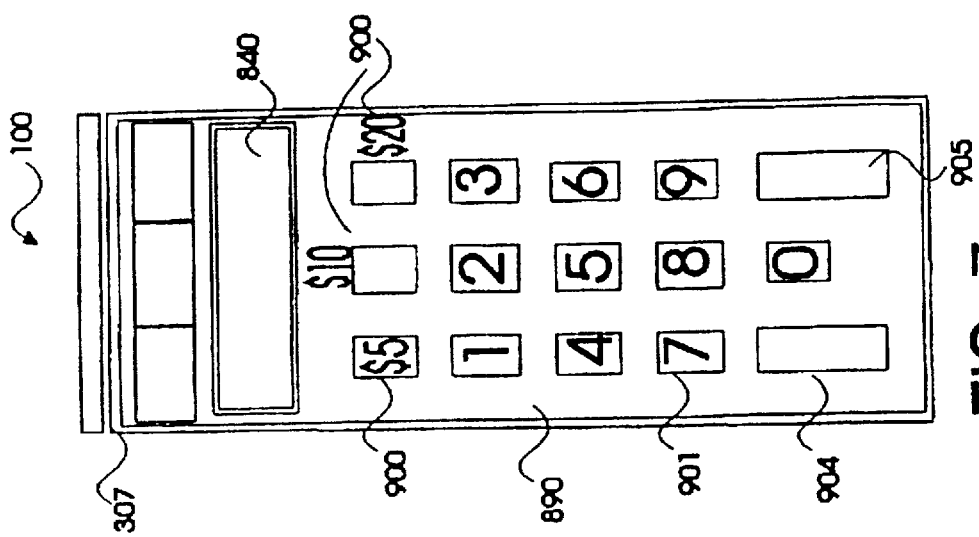
FIG. 7 is a top plan view of a terminal face with which a user interfaces.

FIG. 7 is a plan view of a face of a fund-raising terminal 100. A card reader 307 for reading card information from an information bearing card, and display 840 are disposed on the fund-raising terminal 100. A manually activated means for entering contribution monetary amount information comprises a key representative of a fixed contribution amount 900, e.g. a key representative of ten dollars, a key representative of a single digit integer 901, a confirmation key 904, a negation key 905, or combination thereof. Key 904 may represent a "yes" key. Key 905 may represent a "no" key. It will be understood that key 900 allows for a contributor to make a monetary contribution amount rapidly. Key 900 can have optional information representative of two or more currencies of different countries.

FIG. 10 illustrates a face of terminal 100 used for simplifying and inducing the giving of contributions by contributors to a plurality of fund-raising organizations or causes, e.g. Save the Apes, Save the Kangaroos Fund, and Save the Lions Fund. Optionally, fund-raising management terminal 100, with a face, is used to induce, solicit, facilitate, and receive contributions for a plurality of causes within a specific fund-raising organization. The terminal face used with terminal 100 is used in the method of simplifying and inducing the giving of contributions, receiving and immediately recording thereof upon receipt.

The method comprises the steps disclosed herein comprising providing the contributors making monetary contributions with a portable hand-held terminal 100, preferably held in a palm of the hand, for making of record information of the contribution transaction, e.g. card information and numerical contribution amount information. The terminal 100 has its own source of electric power 1437 (FIG. 1a) and a plurality of entry keys manually operable or activated for entering the amount of the contribution to be given (or a touch sensitive screen input). The terminal also has a reader 307 on the terminal 100 for reading an information bearing card having indicia thereon identifying the cardholder who is the contributor giving the monetary contribution and an optional visual display 840. Display 840 displays the amount entered by manual operation of entry keys for entering the designated monetary amount contributed. Terminal 100 has means therein for recording the amount of the contribution including means for storing the amount correlated to the indicia read on an information bearing card of the corresponding contributor. The correlated amount and indicia read by the reader are for eventual off-loading thereof. Terminal 100 has means for associating or correlating the amount correlated to the indicia read on the record of the corresponding contributor with information representative of a particular cause, fund-raising organization, account within a fund raising organization, or combination thereof. There is also an association or correlation with a respective contributor's information bearing card information, respective contributor's numerical contribution information, and a particular cause, fund-raising organization, account within a fund raising organization, or combination thereof.

By way of further example, terminal 100 has a key associated with indicia representative of a particular cause, fund-raising organization, account within a fund raising organization, or combination thereof. The key 911 (or portion of a touch sensitive screen) represents an operator that designates a contribution to a "Save the Apes" fund or account, key 912 represents a key that designates a contribution to a "Save the Kangaroos" fund or account, and key 913 represents a key that designates a contribution to a "Save the Lions" fund or account. A contributor designates which fund he wishes his contribution to go to, e.g. by pressing key 912 which designates routing of the contribution to the "Save the Kangaroos" fund or account; key 913 represents a key which designates a contribution to a "Save the Lions" fund or account; or, key 911 which represents a key the designates a contribution to a "Save the Apes" fund or account. The contributor's card information and designated contribution monetary amount is associated with his cause designation.

Terminal 100 stores the associated and designated information for eventual off-loading thereof. Off-loading is to fund-raiser's terminal 120, a card account processor 1031, a funds processing network, or combination thereof. The contributor's associated card information, contribution amount and designation is then routed to a particular account. An account can be a separate account within a fund-raising organization group of accounts, an account of a particular fund-raising organization within a group of fund-raising organization accounts, or combination thereof. In a variant, all of the designated contribution monetary amounts are funnelled to a single account.

Provision can be made for a prompt on display 840 which prompts a contributor to enter his card information. A contributor enters his card information which is read by a reader 307. Another prompt on display 840 prompts the contributor to select a particular cause to which he wishes to make a contribution. For example, the contributor selects key 911 representing a "Save the Apes fund or account." The contributor is prompted to enter a numerical contribution amount. For example, the contributor selects $50. The contributor's selection of a numerical contribution amount, e.g. $50, and selection of, e.g. "The Save the Apes Fund," are associated or correlated with the contributor's card information from his respective information bearing card, and stored in the terminal 100 data storage. A plurality of contributors make their subsequent selections. The associated information, e.g. card information from each respective contributor, contribution information from each respective contributor, and designation of cause, fund, or account, are then stored in data storage for eventual off-loading from terminal 100. Off-loading can be to a fund-raiser's terminal 120, a card account processor 1031, a fund-processing data base, a bank, or combination thereof, for further processing. It will be appreciated further post contribution processing can include preparation of a record substantiating the contribution that is then forwarded to the contributor for tax purposes and the like.

The keys 911, 912, and 913 can represent organizations such as the American Red Cross, American Cancer Society, American Diabetes Society, or other fund-raising organization. As will be appreciated contributions can be gathered at funeral homes, hospitals, charitable balls, concerts, and the like, for these various causes.

FIG. 11 illustrates a face of a terminal 100 used for simplifying and inducing the giving of political contributions by contributors. The face is used on a terminal 100 and used in the method the of simplifying and inducing the giving of political contributions by contributors vying for political office, receiving and immediately recording thereof upon receipt. The method comprises the steps disclosed herein comprising providing the contributors making monetary contributions with a portable hand-held terminal 100 for making of record information of the contribution transaction, e.g. cardholder information and numerical contribution amount information. The terminal 100 has its own source of electric power 1437 and a plurality of entry keys manually operable for entering the amount of the contribution to be given. The terminal also has a reader 307 on the terminal 100 for reading an information bearing card having indicia thereon identifying the contributor giving the monetary contribution and an optional display 840. Display 840 displays the amount entered by manual operation of entry keys. Terminal 100 has means for recording the amount of the contribution including means for storing the amount correlated to the indicia read on an information bearing card of the corresponding contributor. The correlated amount and indicia read by said reader are for eventual off-loading thereof. Terminal 100 has means for associating the amount correlated to the indicia read on the record of the corresponding contributor with information representative of a particular candidate for political office. These means include, by way of example, software routines that make the association.

By way of further example, terminal 100 has a key associated with indicia representative of a particular candidate for political office, e.g. Ronald Reagan or Dan Quayle, a particular political office, e.g. President, Mayor, Senator, Representative, Judge, political party committeeman, or combination thereof. By way of example, a contributor designates which candidate, party, and/or political office he wishes his contribution to go to. The contributor's card information and contribution amount is associated with his designation. The contributor's associated card information, contribution amount and designation is then routed to a particular account.

Provision can be made for a prompt on a display 840 which prompts a contributor to enter his card information. A contributor enters his card information which is read by the card reader 307. Another visual prompt on the display 840 prompts the contributor to select a particular candidate to which he wishes make a contribution. By way of example, the contributor selects key 914 representing a candidate for President. Other keys include a key representing a Senator or Senate seat 915, and a key for Mayor 916. Keys can include designations for national, state, and local political offices or candidates. The contributor is prompted to enter a numerical contribution amount. Assume the contributor selects $50. The contributor's selection of a numerical contribution amount, e.g. $50, and selection of, e.g. President, are associated with the contributor's card information from his respective information bearing card, and stored in terminal 100 data storage. A plurality of contributors make their subsequent selections sequentially. The associated information, e.g. card information, contribution information and designation of candidate or political office, are then stored in data storage for eventual off-loading thereof. Off-loading can be to fund-raiser's terminal 120, a card account processor 1031, a funds-processing data base, a bank, or combination thereof, for further processing.

FIG. 12 illustrates a face of a terminal 100 used for simplifying and inducing the giving of contributions by contributors to causes within a religious organization, e.g. First collection, Second Collection, and Cardinal's Appeal. This face is used with a terminal 100 and used in the method of simplifying and inducing the giving of contributions, receiving and immediately recording thereof upon receipt. The method comprises the steps disclosed herein comprising providing the contributors making monetary contributions with a portable hand-held terminal 100 for making of record data of the contribution transaction, e.g. cardholder card information and numerical contribution amount information. The terminal 100 has its own source of electric power 1437 and a plurality of entry keys manually operable for entering the amount of the contribution to be given in one embodiment. The terminal 100 as illustrated in FIGS. 10–12 is a type of terminal accepting transactions by way of information bearing cards. Preferably, terminal 100 is a portable hand-held terminal. This terminal also has a reader 307 on the terminal 100 for reading an information bearing card having indicia thereon identifying the contributor making the monetary contribution and an optional display 840. Display 840 displays the amount entered by manual operation of entry keys. Terminal 100 has means for recording the amount of the contribution including means for storing the amount correlated to the indicia read on an information bearing card of the corresponding contributor. The correlated amount and indicia read by said reader are for eventual off-loading thereof. Terminal 100 has means for associating the amount correlated to the indicia read on the record of the corresponding contributor with information representative of a particular cause, account within a religious organization, or combination thereof. It is also possible to make an association or correlation with a respective contributor's information bearing card information, respective contributor's numerical contribution information, and a particular cause within a religious organization.

Provision can be made wherein a religious organization designates to which collection, or cause, a sub-group of contribution transactions within a group of contribution transactions made during a session are routed. Terminal 100 provides for the designation or grouping of a sub-group of contribution transactions for a particular collection of cause. Terminal 100 has a key, or code that is, associated with indicia representative of a particular collection. Where a code representative of a particular collection is used, the code is associated or correlated with a group of respective contribution transactions. The code is entered by an individual prior to a particular portion of a contribution session. In a variant the code is correlated to a chronological time period during a portion of the contribution session.

A key 911 facilitates designation of a contribution to the "First Collection" fund or account, a key 912 represents a key that designates a contribution to a "Second Collection" fund or account, and key 913 represents a key that designates a contribution to a "Cardinal's Appeal" fund or account. A contributor designates which fund he wishes his contribution to go to, e.g. by pressing the key 912, key 913 or, key 911. The contributor's card information and contribution amount is associated with his designation. Terminal 100 stores the associated and designated information in data storage for eventual off-loading thereof. Off-loading is to fund-raiser's terminal 120, a card account processor 1031, a funds processing network, or combination thereof. The contributor's associated card information, contribution amount and designation is then routed to a particular account. Such an account can be a separate account within a religious organization, an account of a cause within a group of religious organization accounts, or combination thereof.

Furthermore, a prompt on a display 840 prompts a contributor to enter his card information. A contributor enters his card information which is read by reader 307. Another prompt on display 840 prompts the contributor to select a particular cause to which he wishes to make a contribution for. Assume the contributor selects the key 911 representing the "First Collection." Collections include, by way of example, a capital improvement fund collection, a school fund collection, a Cardinal's appeal collection, a collection for the missions overseas, or combination thereof. The contributor is prompted to enter a numerical contribution amount. Assume the contributor selects $50. The contributor's selection of a numerical contribution amount, e.g. $50, and selection of a cause are associated with the contributor's card information from his respective information bearing card, and stored in terminal 100 data storage. A plurality of contributors make their subsequent selections. The associated information, e.g. card information from each respective contributor, contribution information from each respective contributor, and designation of cause, fund, or account, are then stored in data storage for eventual off-loading from terminal 100. Off-loading is to fund-raiser's terminal 120, a card account processor 1031, a fund-processing data base, a bank, or combination thereof, for further processing. As will be appreciated further processing can include preparation of a record substantiating the contribution that is then forwarded to the contributor for tax purposes and the like.

FIG. 13 illustrates a method of obtaining contributions. The method simplifies the way a contribution is given and induces the giving of a contribution. A portable hand held terminal 100 is provided for receiving and immediately recording a contribution given. The contribution is made by use of card information from an information bearing card 145/150. As described above, information bearing card 145/150 is a credit card 145, debit card 150, or combination thereof.

A first contributor 1 is handed a portable electronic terminal 100 for making of record data of a contribution. The contribution is made by the contributor using an information bearing card such as a credit card 145, debit card 150, or combination thereof. Preferably terminal 100 has its own source of electric power 1437 and a plurality of optional keys (as described above) manually operable for entering the amount of the monetary contribution to be given, designation of a cause, etc. In a preferred embodiment, terminal 100 has a case dimensioned for being held in the palm of contributor 1's hand 1R. The terminal 100 has a reader 307 disposed on terminal 100 for reading a card record medium, e.g. an information bearing card. The card record medium has indicia identifying a contributor 1 making a given monetary contribution. The terminal has means for making a visual display 840 of the amount entered by manual operation of entry keys. Terminal 100 also has means for recording the amount of the contribution, e.g. data storage 302, including means for storing the amount of the contribution correlated to the indicia read on the record medium, e.g. information bearing card, of the corresponding contributor 1. The correlated amount and indicia read by reader 307 are for eventual off-loading from the terminal 100.

Contributor 1 is handed a terminal 100. By way of example, contributor 1 is provided terminal 100 by a card account processor, a bank, a fund-raising organization, a manufacturer, third party account processor, or a combination thereof. The contributor 1 holds the terminal 100 in hand 1R. Contributor 1 enters is card information by way of card reader 307 disposed on terminal 100. The contributor 1 takes his information bearing card, e.g. a credit card 145, debit card 150 or combination thereof, with his fingers on hand 1L, and passes it through card reader 307 disposed on terminal 100. The reader 307 reads information on contributor 1's information bearing card and stores it in a data storage. Contributor 1 then uses his fingers on hand 1L and enters a contribution amount, a designation for a particular cause the contribution is for, or combination thereof. The contributor 1 can press a single key disposed on terminal 100, e.g. a $5 key, to enter a contribution monetary amount. The contributor 1 can press a combination of keys on a keyboard disposed on the terminal 100 to designate a contribution amount, e.g. $35.71. Contributor 1's contribution amount and respective card information are correlated, and stored in a data storage on terminal 100. Contributor 1 can enter card information with a single information bearing card or with multiple information bearing cards.

Contributor 1 then passes the terminal 100, as indicated by phantom line 11, to second contributor 2. The second contributor 2 receives terminal 100 from contributor 1 in his hand 2R. Contributor 2 enters his respective card information by way of card reader 307 disposed on the terminal 100.

The contributor 2 takes his information bearing card, e.g. a credit card 145, debit card 150 or combination thereof, with his hand 2L, and passes it through card reader 307 disposed on terminal 100. The card reader 307 reads information on contributor 2's respective information bearing card and stores it in a data storage. Contributor 2 then uses his hand 2L and enters a contribution amount, a designation for a particular cause the contribution is for, or combination thereof. The contributor 2 can press a single key disposed on terminal 100, e.g. a $10 key, to enter a contribution amount (FIGS. 10, 11). Optionally, contributor 2 can press a combination of keys on a keyboard disposed on terminal 100 to designate a contribution amount, e.g. $77.73. Contributor 2's contribution amount and respective card information are correlated, and stored in a data storage on terminal 100.

The process is repeated for each respective subsequent contributor. For example, contributor 2 passes terminal 100, as indicated by phantom line 1N, to contributor N. Contributor N receives terminal 100 from contributor 2 in his hand NR. Contributor N enters his respective card information by way of card reader 307 disposed on terminal 100.

Contributor N takes his respective information bearing card, e.g. a credit card 145, debit card 150 or combination thereof, with his fingers on hand NL, and passes it through card reader 307 disposed on terminal 100. The reader 307 reads information on contributor N's respective information bearing card and stores it in a data storage. Contributor N then uses his hand NL and enters a contribution amount, a designation for a particular cause the contribution is for, or combination thereof. The contributor N may press a single key disposed on terminal 100, e.g. a $50 key, to enter a contribution amount. Optionally, contributor N may press a combination of keys on a keyboard disposed on terminal 100 to designate a contribution amount, e.g. $99.73. Contributor N's contribution amount and respective card information are correlated, and stored in a data storage on terminal 100.

For example, several hundred contribution transactions ("L" contribution transactions) can be made sequentially in this manner on a first terminal 1001. A plurality of terminals 100, e.g. terminal $100_1$ . . . through terminal $100_Z$ are circulated. Each respective terminal 100 can collect "L" contribution transactions. The result is that "L" contribution transactions times "Z," the number of fund raising management terminals, gives (Q) total contribution transactions received. L*Z=Q. In one variant of the invention, it will be understood that (Q), e.g. tens of hundreds of contribution transactions, have been received before interposing a request for verification or authorization, authorization step, verification step, or a combination thereof, between two respective contribution transactions within the group of contribution transactions (Q) during a contribution session.

In the scenario where contributor 1 has contributed contributor 1's respective contribution amount of $5.00, and his respective card information; where contributor 2 has contributed his respective contribution amount of $10.00 and his respective card information; and, where contributor 3 has contributed his respective contribution amount of $50.00 and his respective contribution amount, contributor N has contributed his respective contribution amount of $100.00 and his respective card information, data storage in terminal 100 stores the following:

Contributor 1's card information $5.00
Contributor 2's card information $10.00
Contributor 3's card information $50.00
Contributor N's card information $100.00
Subsequently, terminal 100 transmits:
Contributor 1's card information and associated $5.00
Contributor 2's card information and associated $10.00
Contributor 3's card information and associated $50.00
Contributor N's card information and associated $100.00 to fund-raiser's terminal 120 via docking station 1999. That a communication link is established between terminal 100 and terminal 120 for the transmission of the information above. Terminal 120 stores the information:

Contributor 1's card information and associated $5.00
Contributor 2's card information and associated $10.00
Contributor 3's card information and associated $50.00
Contributor N's card information and associated $100.00

Terminal 120 then transmits the information, including optional information identifying a fund-raising organization, an account of a fund-raising organization, or combination thereof, via communication link 1030, by way of example a telephone line, to card account processor 1031 or a funds processing network.

Optionally, an authorization is obtained at card account processor 1031 for each contribution transaction. By way of example, information designating each contribution transaction as authorized or unauthorized may be added to each respective contribution:

Contributor 1's card information and associated $5.00—unauthorized
Contributor 2's card information and associated $10.00—authorized
Contributor 3's card information and associated $50.00—authorized
Contributor N's card information and associated $100.00—authorized The authorized contribution transactions are then processed further. Processing includes debiting or charging, as appropriate, an account of a contributor for the amount of the authorized contribution. By way of example, Contributor 2's account is debited $10.00;
Contributor 3's account has a charge added to it of $50.00; and,
Contributor N's account has a debit entered to it of $100.00.

An account of a fund-raising organization is augmented the amount of the authorized contributions. By way of example, fund raiser's account 1033 would be augmented for the $10.00 received from contributor 2, for the $50.00 received from contributor 3, and for the $100.00 received from contributor N.

Contributor 1's contribution was unauthorized. As an unauthorized contribution it may be reported to the fund raising organization. The fund- raising organization may choose to follow up with Contributor 1 to determine if the contributor would like to make a subsequent contribution. Optionally, contributor 1's card information and respective contribution amount of $5.00 may be discarded.

Optionally, as each contributor, e.g. 1,2, ... N, enters his respective card information and respective contribution amount on terminal 100, terminal 100 transmits each respective card information and respective contribution amount for each contributor to terminal 120, which is remote from terminal 100. Terminal 120 then stores a back-up copy of each contribution transaction, e.g. respective contributor contribution amount information and card information in a data storage. Optionally, each respective contributor's card information and numerical information of a monetary contribution amount is stored in terminal 120 in a group for eventual transmission thereof to a card account processor 1031 via communication link 1030. Optionally, terminal 100 transmits card information and contribution amount information after a certain minimum threshold value has been reached. By way of example, terminal 100 transmits this information after a threshold contribution level of, for example, $500.00 or $1000.00 has been reached. Optionally, every time a threshold amount has been reached a transmission via a communication link to fund-raiser's terminal 120, card account processor 1030, a bank, or combination thereof is made. As described previously, a communication link can include a mobile telephone cellular link, a communication link incorporating pager technology, a communication link to a satellite, and the like.

In yet a further embodiment, a group of contribution transactions are forwarded from terminal 100 to terminal 120, terminal 120 makes a copy of the contribution transactions and then automatically initiates a downloading procedure to card account processor 1030, a bank, a fund processing network, or combination thereof.

It will be appreciated that this back-up feature will decrease the risk of loss of card information and contribution amount information in the event that terminal 100 is accidentally damaged or malfunctions.

By way of example, in the scenario where contributor 1 has entered his respective contribution transaction, terminal 100 transmits contributor 1's respective contribution transaction to terminal 120 (which is remote in this example) via a wireless communication link 140. Terminal 120 stores contributor 1's contribution transaction in a data storage for eventual transmission to card account processor 1031. Terminal 100 retains a record of contributor 1's contribution transaction. Terminal 120 retains a copy of contributor 1's contribution transaction. Optionally, the copy of contributor 1's transaction in terminal 100's data storage can be compared to the copy in terminal 120's data storage.

Contributor 2 enters his contribution transaction. Terminal 100 transmits contributor 2's respective contribution transaction to terminal 120 (which is remote in this example) via a wireless communication link 140. Terminal 120 stores contributor 2's contribution transaction in a data storage for eventual transmission to card account processor 1031. Terminal 100 retains a record of contributor 2's contribution transaction. Terminal 120 retains a copy of contributor 2's contribution transaction. Optionally, the copy of contributor 1's transaction in terminal 100's data storage can be compared to the copy in terminal 120's data storage. Optionally, contributor 1's and contributor 2's contribution transactions are grouped together for eventual transmission to card account processor 1031.

If the terminal 100 is accidentally damaged as it makes its way to contributor N so that it is no longer operational and so that it has lost the contribution data in data storage 302. It will be appreciated that since a "copy" of the contribution transactions of contributors 1 and 2 are retained in terminal 120, these contribution transactions can still be submitted to card account processor 1031 for processing, whereas lack of this back up feature would have resulted in the loss of the contribution transactions made by contributors 1 and 2. It will be understood that this feature will provide a great deal of security in the event there are thousands of dollars of contribution transactions received by terminal 100 and terminal 100 is lost, damaged, or stolen.

A method of reducing the risk associated with the damage to data storage of a portable terminal 100, or the loss, or theft of terminal 100, is also provided. A contributor 1 enters his contribution transaction into portable a terminal 100. A record of the contribution transaction is retained in terminal 100. A single contribution transaction, or preferably a plurality of contribution transactions, are transmitted to terminal 120 via communication link 140, preferably a wireless communication link. Terminal 120 stores a "copy" of the single contribution transaction, or a "copy" of a plurality of contribution transactions in a data storage. Eventually, terminal 120 transmits a single contribution transaction or a group of contribution transactions to a card account processor 1031 for processing.

Optionally, the original single contribution transaction, or plurality of contribution transactions, are transmitted to terminal 120 from terminal 100 and no record copy of the transaction is retained in terminal 100 data storage.

FIG. 14 illustrates a variation of the method of receiving a contribution of FIG. 13. The method simplifies the way a contribution is given and induces the giving of a contribution. Terminal 100 is provided for receiving and immediately recording the contribution. The contribution consists of card information from an information bearing card 145/150. As described above, information bearing card 145/150 is a credit card 145, debit card 150, or combination thereof.

A contributor N is provided for making of a monetary contribution with a portable terminal 100 for making of record data of a contribution by an agent 4 of a fund-raising organization. As used herein, the term agent refers to a volunteer, employee, principle or any individual acting on behalf of a fund-raising organization or a cause. The contribution is made by contributor N by way of information bearing card 145/150. Preferably terminal 100 has its own source of electric power 1437 and a plurality of optional entry keys manually operable for entering the amount of the monetary contribution to be given. In a preferred embodiment, terminal 100 has a case dimensioned for being held in the palm of contributor N's hand NR. Terminal 100 has a reader 307 disposed on terminal 100 for reading a record medium, e.g. an information bearing card. The record medium has indicia thereon identifying a contributor N making a given monetary contribution. The terminal has optional means for making a visual display 840 of the amount entered by manual operation of entry keys. Terminal 100 also has means for recording the amount of the contribution, e.g. data storage 302, including means for storing the amount of the contribution correlated to the indicia read on the record medium, e.g. information bearing card, of the corresponding contributor N. The correlated amount and indicia read by reader 307 are for eventual off-loading from terminal 100.

Contributor N is provided terminal 100 or agent 4 holds the terminal in hand 5R. By way of further example, contributor N holds terminal 100 in hand NR. Contributor N enters card information by way of card reader 307 disposed on terminal 100 or agent 4 enters the contributor's card information. The contributor N, or agent 4, takes contributor N's information bearing card, e.g. a credit card 145, debit card 150, or combination thereof, with hand NL or the agent's hand, and passes it through card reader 307 disposed on terminal 100. Reader 307 reads information on contributor N's information bearing card and stores it in a data storage. Contributor N or agent 4 then uses his hand NL or the agent's hand and enters a contribution amount, a designation for a particular cause the contribution is for, or combination thereof. By way of further example, contributor N or agent 4 may press a single key disposed on terminal 100, e.g. a $5 key, to enter a contribution amount. Optionally, contributor N or agent 4 may press a combination of keys on a keyboard disposed on terminal 100 to designate a contribution amount, e.g. $35.71. Contributor N's contribution amount and respective card information are correlated, and stored in a data storage on terminal 100. Contributor N or agent 4 may enter card information with a single information bearing card or with multiple information bearing cards.

Figure 15:
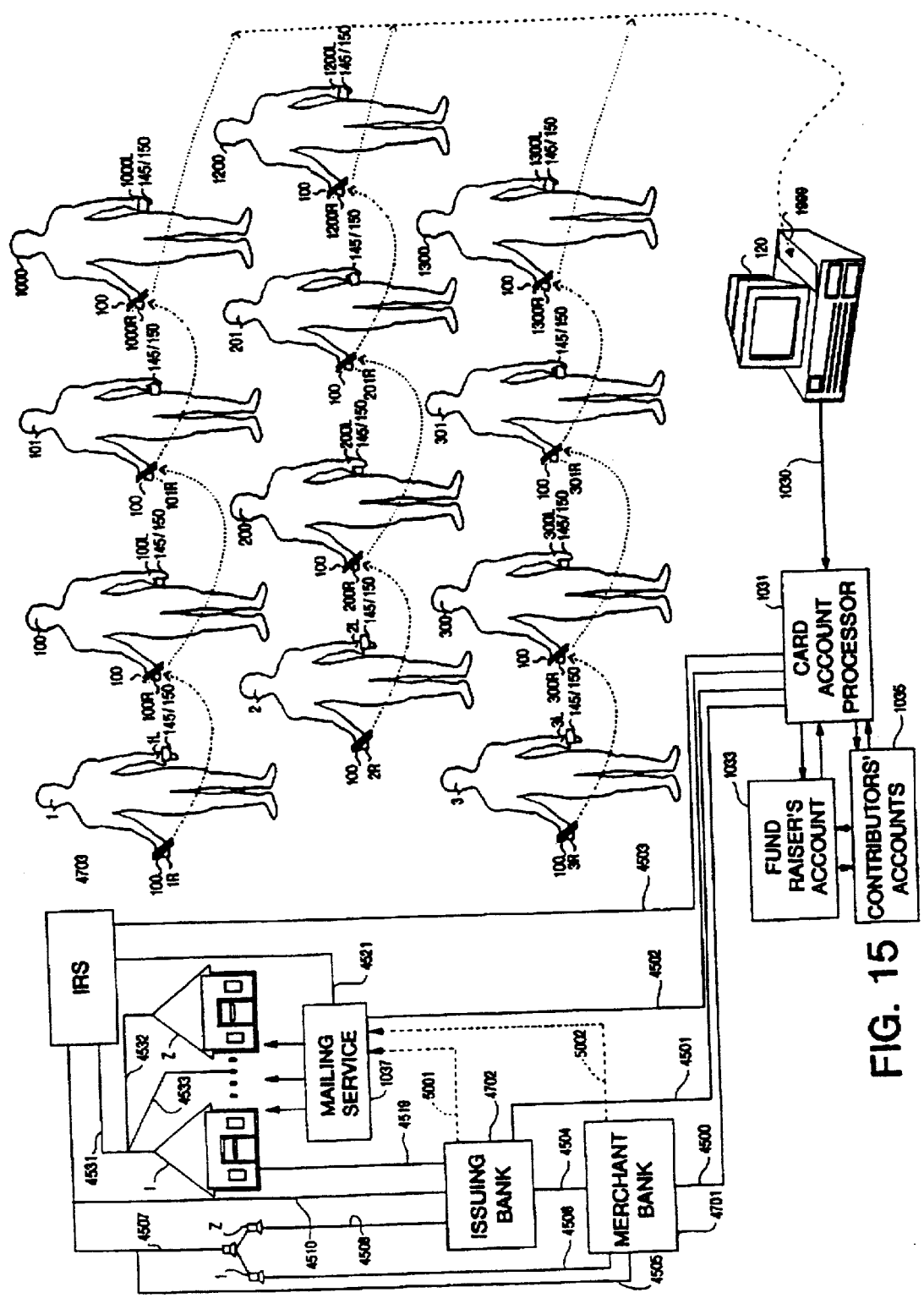
FIG. 15 is a diagram of a method of substantiating contributions made to a fund-raising organization.

FIG. 15 is a diagram of a method of substantiating a contribution. The method also is used for substantiating a charitable contribution deduction.

The contribution is made by way of an information bearing card.

A contributor making a monetary contribution is provided with a portable terminal 100 for making of record information of the contribution transaction. The contribution transaction comprising card information from a respective contributor's information bearing card, contribution amount information, a designation of a particular cause for which the contribution is made, contribution routing information, a designation of the tax deductibility of a particular contribution transaction, or a combination thereof. In one embodiment, terminal 100 has its own source of electric power and a plurality of entry keys manually operable for entering the amount of the contribution to be given, a designation of a particular cause for which the contribution is to be made, or combination thereof. In an alternate embodiment, terminal 100 has the features described above. A reader 307 on terminal 100 reads information from a respective contributor's information bearing card having indicia thereon identifying the contributor giving the monetary contribution. Terminal 100 has optional means for making a visual display of the amount entered by manual operation of entry keys, and the terminal has means for recording the amount of the contribution including means for storing the amount correlated to the indicia read on the information bearing card of the corresponding contributor, correlated to a contributor's designation of a cause, or correlated to a combination thereof. The contribution data is retrieved from terminal 100, and downloaded to fund-raiser's terminal 120, card account processor 1031, a bank 1043, a funds processing network, e.g. VISA Net, or a combination thereof.

Processing of the retrieved data of the contribution transaction occurs as described above. Processing includes by way of example, associating an address, e.g. a postal address, electronic mail address, e.g. e-mail address, with a contributor, and preparing a record of the contribution transaction. The record of the contribution transaction is forwarded to said contributor. The record may be a hard copy print out of the transaction forwarded to a mailing service 1037. The mailing service 1037 then forwards the record of the transaction to the contributor.

By way of example, contributor N makes a contributions transaction as described above on terminal 100. Terminal 100 downloads or off-loads the contribution transaction data to terminal 120 via docking station 1999 and communication link 140, card account processor 1031 via communication link 1030, a bank 1043 (FIG. 15*a*), a network, or combination thereof. The contribution transaction data is processed. Processing includes routing funds from and to appropriate accounts 1033, 1035, debiting and crediting respective accounts, and preparing records of these transactions. Processing can also include grouping a contribution transaction with other contribution transactions that qualify for a charitable contribution deduction for a single cardholder that is a contributor, or a plurality of cardholders that are contributors. Processing also can include grouping contribution transactions made by a single contributor to a particular fund-raising organization, e.g. a church, the American Red Cross, or particular type of fund-raising organization, e.g. health related fund-raising organizations, arts related fund-raising organizations, etc. Processing can also include grouping contribution transactions.

By way of example, assume, contributor$_1$ makes contribution transactions 1 through 100 during a specified time period, e.g. one week, one month, one year, one taxable time period. Contribution transactions 1 through 100 are grouped into authorized and unauthorized transactions. Assume contribution transactions 95 through 100 are unauthorized, and contribution transactions 1 through 94 are authorized. Contribution transactions 1 through 94 are grouped into contribution transactions that qualify for a charitable contribution deduction and those that do not qualify for a charitable contribution deduction. Assume that contribution transactions 1 through 50 qualify for a charitable contribution deduction and that contribution transactions 51 through 94 do not qualify for a charitable contribution deduction. Records of contribution transactions 1 through 50 are then be forwarded to a contributor, e.g. by mailing a record of the contribution transactions or electronically forwarding signals representative of the contribution transactions to a contributor, tax processing body, e.g. the IRS, a fund-raising organization, e.g. a church, or a combination thereof. It will be understood that signals representative of contribution transactions 1 to 100, signals representative of an accounting report, or a combination thereof, are sent to a fund-raising organization from a card account processor, settling bank, issuing bank, merchant bank, or a combination thereof, via a communication link. The process is repeated for contributor$_1$ through contributor$_N$. It will be understood that a large number of contribution transactions can be substantiated and accorded the status of a charitable contribution deduction, and a substantial amount of transaction costs saved which would have to expended for substantiating charitable contributions made by cardholders to fund-raising organizations by employing terminal 100 and methods referred to herein.

A record of a contribution transaction or a group of transactions is routed to a mailing service 1037, e.g. the U.S. Post Office, a private mail courier, or the like. The mailing service 1037 delivers the record of the contribution transaction to a mailing address of contributor 1039. The record of the contribution is used by the contributor to substantiate the contribution made to the fund-raising organization. Substantiation may be made to a national, state, or local taxing body, e.g. the Internal Revenue Service. It will be understood that the transaction costs associated with providing substantiation for charitable contribution deductions, and the like, for a plurality of cardholders who are contributors are reduced by utilization of the above method.

In an alternate method, the method comprises the step of forwarding a record of the contribution transaction to contributor N by electronically mailing, e.g. e-mailing, a record of the contribution transaction to contributor N using a communication link, e.g. phone lines. By way of example, a periodic statement regarding contributions is sent to a contributor via a network of computers, e.g. Prodigy, America On line, and the like, to a contributor's home computer terminal via a communication link, e.g. a telephone hook up.

The record of the contribution transaction is forwarded by a bank 1043, a card account processor 1031, by way of example, Card establishment Services of Melville, N.Y., or VISA Merchant Bank Services of San Mateo, Calif., a fund-raising organization, an issuing bank, a processing bank, a merchant bank, or combination thereof, to contributor N.

In yet another embodiment of the method, a record of the contribution transaction, or a plurality of contribution transactions made by a contributor, are electronically forwarded, mailed, or combination thereof, to a governmental tax processing body, e.g. the Internal Revenue Service. It will be appreciated that the method disclosed herein has a number of benefits, including the reduction of the work and resources associated with preparing tax returns and claiming charitable contribution deductions, reducing the amount of fraud associated with claiming charitable contribution deductions, reducing the amount of work a governmental tax processing authority has to do when processing charitable contribution deductions.

The method provided above can also include the step of associating charitable contribution data with a tax identification number of a contributor, e.g. a social security number of a contributor and the like, a tax return for a contributor, or a combination thereof. It will be appreciated that the association of the tax identification number associated with a contributor, a tax return of a contributor, and a contribution transaction or plurality of contribution transactions for a contributor, and the direct forwarding of the contribution transaction information to a tax processing governmental body will greatly simplify the processing of charitable contribution deductions and the like.

The present invention further contemplates forwarding a record of contribution transactions to a fund-raising organization, a contributor, or to a contributor on behalf of a fund-raising organization from a card account processor 1031, a bank, or combination thereof. As will be appreciated utilization of this method provides the benefits of decreased paper work for fund-raising organizations involved with substantiating contributions made by contributors.

The method further optionally includes the step of providing a contemporaneous, or subsequent, written acknowledgment or record of the contribution by the fund-raising organization. The acknowledgement or record substantiating a contribution includes the following information, or combination thereof:

(1) The amount of cash or equivalent card information and numerical contribution amount contributed;

(2) Whether the fund-raising organization provided any goods or services in consideration, in whole or in part, in exchange for the cash contributed; and, (3) A description and good faith estimate of the value of any goods or services referred to in (2) above of, or if such goods or services consist solely of intangible religious benefits a statement to that effect.

The term intangible religious benefit refers to any intangible religious benefit which is provided by an organization organized exclusively for religious purposes and which generally is not sold in a commercial transaction outside the donative context. An acknowledgement is considered contemporaneous if the contributor taxpayer obtains the acknowledgement on or before the earlier of (1) the date on which a taxpayer files a return for the taxable year in which the contribution is made, or the due date (including extensions) for filing such a return. By way of example, such substantiation is provided by portable hand-held terminal 100, fund-raising terminal 120, a printer, a portable hand-held terminal 100, wherein portable hand-held terminal 100 has its own source of electrical power and an integral printer, a card account processor 1030, a bank, a fund-raising organization, or combination thereof. The acknowledgment is a periodic statement reflecting information bearing card account balances and the like, in one embodiment.

In yet another embodiment of the method, such substantiation is provided by a standard information bearing card 145/150, fund-raising terminal 100, a printer, a card account processor 1030, a bank, a fund-raising organization, or combination thereof.

The method also includes the optional step of a fund-raising organization providing substantiation of a contribution to a tax processing governmental body, e.g. the Internal Revenue Service, on a hard copy of a tax return or electronically. The substantiation and record thereof, includes, by way of example, (1) The amount of cash, card information and numerical contribution amount contributed by a respective contributor, or a group of contributors;

(2) Whether the fund-raising organization provided any goods or services in consideration, in whole or in part, in exchange for the cash contributed; and, (3) A description and good faith estimate of the value of any goods or services referred to in (2) above of, if such goods or services consist solely of intangible religious benefits a statement to that effect.

Terminal 100, terminal 120, card account processor 1030, a bank, a fund-raising organization, or combination thereof, optionally associate to a contribution transaction, e.g. one including card information and numerical contribution amount information for a single contributor or a plurality of contributors, a designation regarding the tax deductibility status of the contribution transaction. By way of example, the status may include whether or not the contribution is or is not tax deductible, or whether the organization to which the contribution is falls under a certain category of taxable organization, or combination thereof.

Figure 15A:
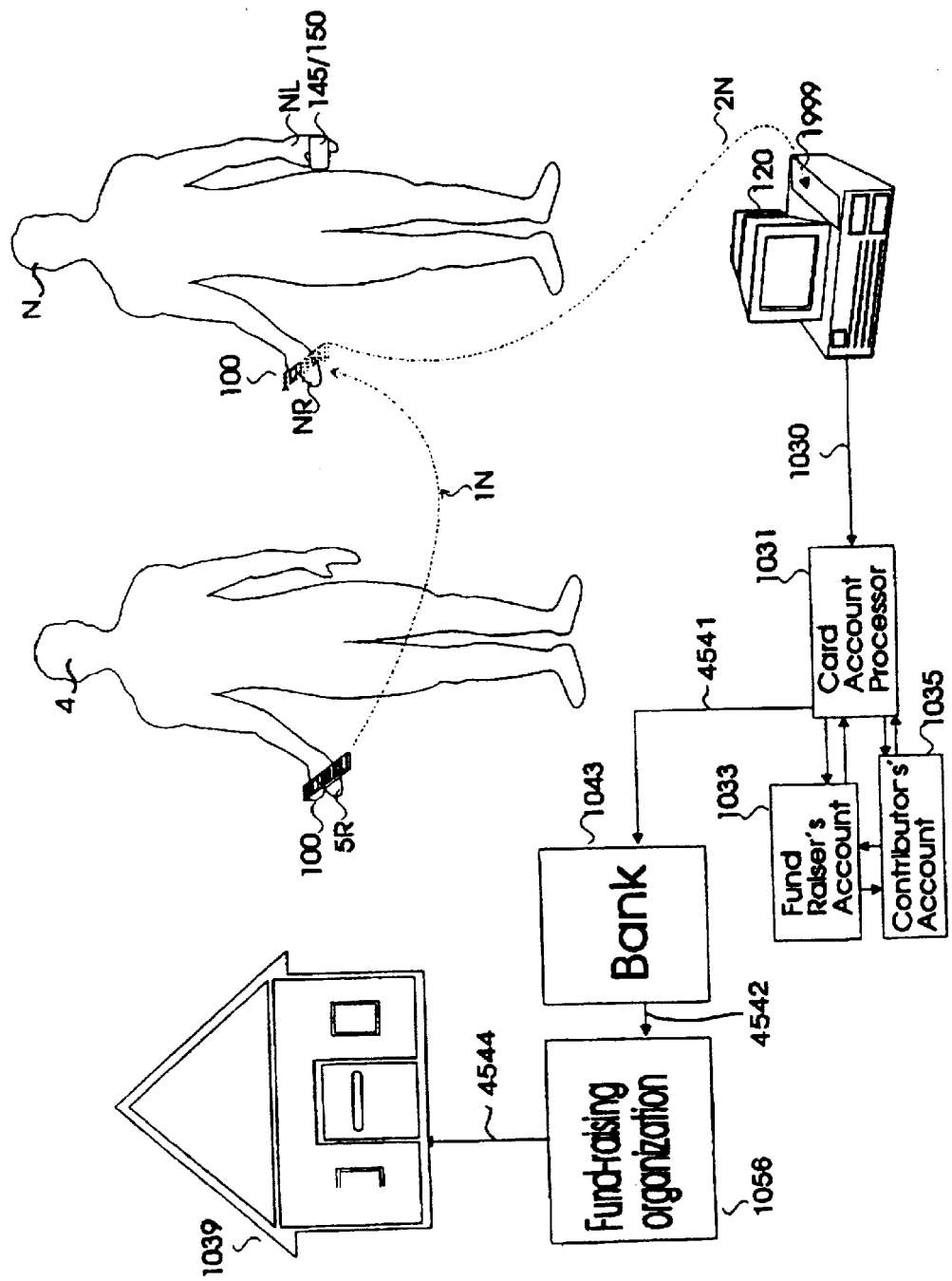
FIG. 15a is another embodiment of a method of FIG. 15 for substantiating contributions made to a fund-raising organization; and, FIG. 16 is a diagram of a method of soliciting contributions for a plurality of causes and a method of processing the contributions collected.

As illustrated in FIGS 14–15a, the cover or case of a terminal 100 is constructed so as to fit easily in the palm of hand of a contributor. The case can be molded to include on the sides thereof corrugations or indentations for the fingers and palm of a contributor. Alternately terminal 100 can include a handle that is fixed to the terminal 100 or is rotatably fixed to terminal 100 to assist in passing the terminal from one contributor to another contributor.

FIG. 15 illustrates a multiplicity of contributors using plurality or multiplicity of terminals 100 for making a multiplicity of contribution transactions. For example, contributor 1 uses a first terminal 100 and makes a contribution transaction on terminal 100.

Contributors pass the first terminal 100 sequentially to subsequent contributors, e.g. the next contributor through contributor 1000, e.g. the 1000th contributor in this first group. This first group of contributors makes sequential contribution transactions on a first terminal 100.

Contributors pass the second terminal 100 sequentially to subsequent contributors, e.g. the next contributor through contributor 1200, e.g. the 1200th contributor in this second group. The second group of contributors makes sequential contribution transactions on the second terminal 100.

Contributors pass the third terminal 100 sequentially to subsequent contributors, e.g. the next contributor through contributor 1300, e.g. the 1300th contributor in this third group. The third group of contributors makes sequential contributions transactions on the third terminal 100.

The sequential contribution transactions made by the three groups, respectively, on the first terminal 100, the second terminal 100, and the third terminal 100 are uninterrupted by requests for authorization or verification of the respective contribution transactions. The first terminal 100, second terminal 100, and third terminal 100 is brought back to docking station 1999 after the contribution session, and the multiplicity of sequentially made contribution transaction information is down loaded or off-loaded sequentially from each respective terminal 100 to terminal 120 via a communication link, to a card account processor 1031 via communication link 1030, or a combination thereof.

FIG. 15 also illustrates communication links that are used in a system and methods of the invention. Communication links (analogous to links 140, 1030) are used to transmit a single or a group of contribution transaction information units, e.g. correlated cardholder and contribution amount information; correlated cardholder, contribution amount, and tax deductibility status of a particular contribution amount; correlated cardholder, contribution amount, and cause information; an electronic record of contribution transactions made at a single contribution session or a group of contribution sessions for a single contributor or group of contributors; charitable contribution deduction substantiation paper records and electronic records; electronic records for substantiating contribution transactions made at a single contribution session or a group of contribution sessions for a single contributor or group of contributors; or combination thereof. These information units are transmitted to a merchant bank 4701; an issuing bank 4702; home computers 1' through Z' of respective contributors; homes or mailing addresses of respective contributors (where Z' is an integer); mailing service 1037; the Internal Revenue Service 4703 (or other taxing processing entity) or a combination thereof.

For example, card account processor 1031 transmits information representative of the information units, electronic records, other information referred to above, or a combination thereof, to merchant bank 4701 via communication link 4500, e.g. a telephone link or dedicated line, to issuing bank 4702 via communication link 4501, to a mailing service 1037 via communication link 4502. Issuing bank 4702 has a communication link 4504 with merchant bank 4701. Merchant bank 4701 has a communication link 4505 with the Internal Revenue service 4703. Merchant bank 4701 has a communication link 4506 with the networked home computers 1' through Z' of respective contributors. Home computers 1' through Z' of respective contributors have a communication link 4507 with the tax processing body 4703. Issuing bank 4702 has a communication link 4510 with the Internal Revenue Service 4703. Issuing bank 4702 has a communication link 4508 with the networked home computers 1' through Z' of respective contributors. Merchant bank 4701, issuing bank 4702, card account processor 1031, or a combination thereof, routes records of correlated contribution transactions and charitable contribution deduction substantiations and other paper or electronic records in a variant to mailing service via routes 5002, and 5001 respectively. Mailing service 1037 then distributes the records to each respective contributors home as indicated by the arrows in FIG. 15. Issuing bank 4702, merchant bank 4701, or a combination thereof, also has a communication link 4519 to respective contributors homes. Mailing service has communication link 4521 with IRS 4703. Links 4531, 4532, 4533 represent communication links with the respective contributors' homes and the IRS 4703. It will be understood that the various communication links illustrated are used in the methods and systems described herein and facilitate, simplify, and lower transaction costs for the substantiation of charitable contribution deductions given by a multiplicity of cardholder contributors on a multiplicity or plurality of terminals 100.

FIG. 15a illustrates the flow of correlated contribution transaction information made on terminal 100 as described. Terminal 100 transmits a multiplicity of contribution transaction information to terminal 120 when terminal 100 is communicative linked to docking station 1999 via link 2N after a contribution session with a plurality of contributors. Terminal 120 transmits the correlated information via link 1030 to a card account processor 1031. Card account processor 1031 processes the information. Card account processor 1031 transmits the correlated and processed information to bank 1043 via communication link 4541. Bank 1043 transmits the correlated and processed information via link 4542 to fund-raising organization 1056. Fund-raising organization then transmits the correlated and processed information by route 4544 to a mailing address 1039 of a respective contributor.

Figure 16:
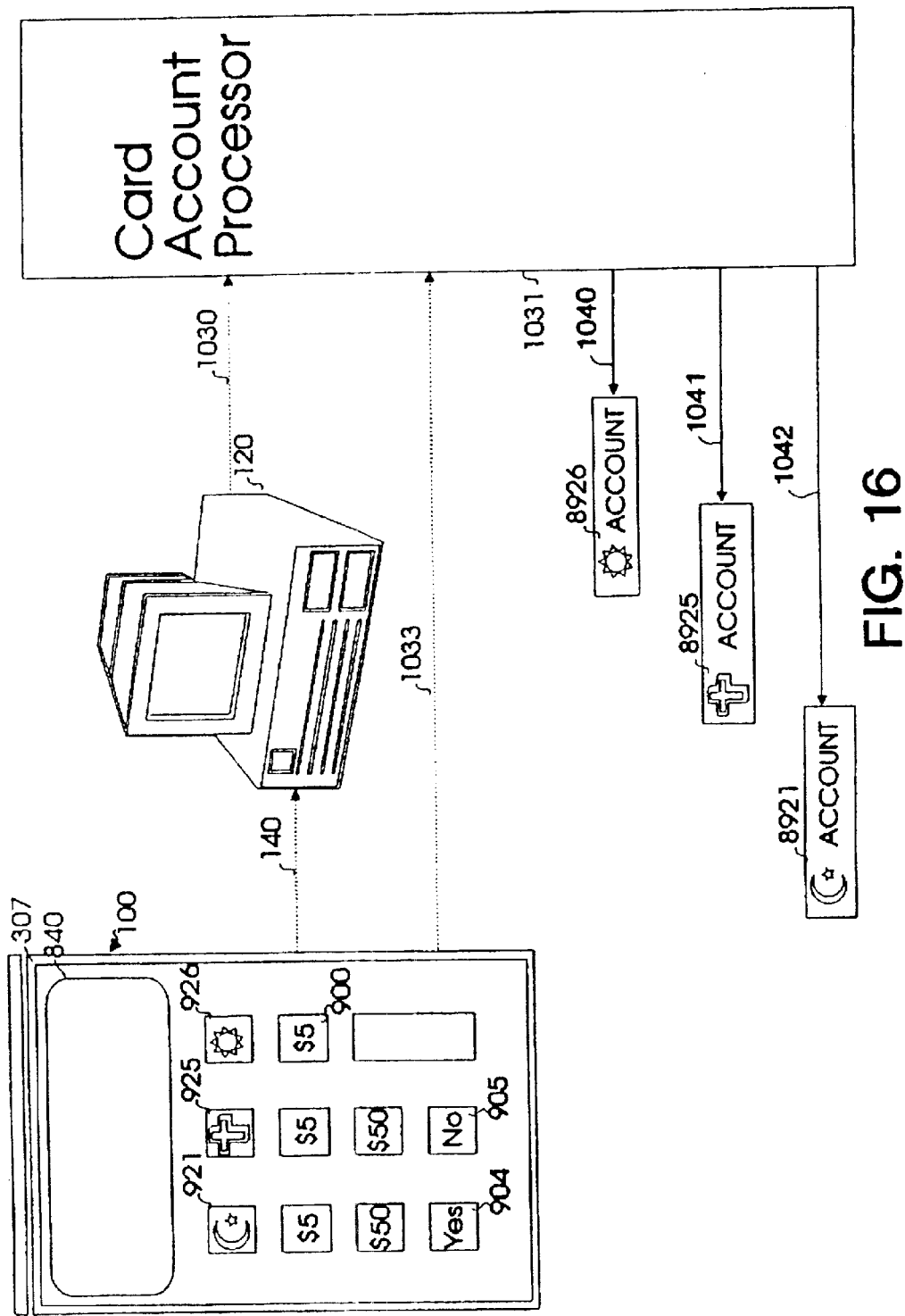

FIG. 16 illustrates a method of simplifying and inducing the giving of monetary contributions by contributors (Contributors include individuals) as described above and illustrates a method of routing and system for routing contribution transactions correlated with different fund-raising organizations or different accounts of fund-raising organizations. The method includes receiving and immediately recording a multiplicity of contributions made by use of an information bearing card on terminal 100.

The method consists of providing the contributors making monetary contributions with a portable, hand-held terminal 100 for making of record data of the contribution transaction. In one embodiment, terminal 100 has its own source of electric power and a plurality of entry keys manually operable for entering the amount of the contribution to be given. Terminal 100 has a face as described in FIGS 10–12. In another embodiment, terminal 100 is an information bearing card terminal 100 or peripheral 100. A card reader 307 is disposed on terminal 100 for reading an information bearing card having indicia thereon identifying the contributor making the monetary contribution. Terminal 100 has optional means for making a visual display of the monetary contribution amount entered by manual operation of entry keys. Terminal 100 has means for recording the amount of the contribution including means for storing the amount correlated to the indicia read on the information bearing card of the corresponding contributor. The correlated amount and indicia read by the card reader from the information bearing card are for eventual off-loading from terminal 100 as described above. Off-loading, e.g. downloading, of the associated cause information, respective contribution amount information, and card information from a respective contributor, is to a fund-raiser's terminal 120, fund processing network, e.g. VISA Net, a bank, or a combination thereof, via communication links 140, 1030, 1033, or combination thereof. The card account processor 1031, fund processing network, e.g. VISA Net, a bank, or combination thereof, route the associated card information, contributor information, and account designation to an account of a single fund-raising organization, to a plurality of accounts of a single fund-raising organization associated with the cause for which the contributor designation was made, or a combination thereof.

For example, key 921 represents a first cause 921, key 925 represents a second cause, and key 926 represents a third cause. A first contribution transaction is correlated with information representative of first cause 921. A second contribution transaction is correlated with information representative of second cause 925. A third contribution transaction is correlated with information representative of third cause 926. The correlated information is transmitted to terminal 120 via link 140, then to card account processor 1031. In a variant correlated contribution transactions are transmitted to card account processor 1031 via link 1033.

The method and system includes routing the respective contributions to causes 921, 925, 926 to each respective account of each respective cause. The information of the first correlated contribution transaction is routed to account 8921 via communication link 1042. The information of the second correlated contribution transaction is routed to account 8925 via communication link 1041. The information of the third correlated contribution transaction is routed to account 8926 via communication link 1040.

As will be understood contribution transaction information can be routed to a plurality accounts, that include by way of example, a plurality of accounts within a single fund-raising organization, accounts for a plurality of fund-raising organizations, accounts for a plurality of causes, or combination thereof.

As mentioned above, the use of terminal 100 as it is passed from one contributor to another contributor will increase the risk of terminal 100 being damaged by being accidentally dropped. Optionally, the terminal 100 also comprises a shock-absorbing material surrounding the case of terminal 100 (not pictured). Shock absorbing material can be located around the exterior to terminal 100 to shield terminal 100 from damage in the event the terminal is accidentally dropped. Shock absorbing material can also be used inside terminal 100 to shield circuitry. Alternately the shell of terminal 100 may be constructed of shock absorbing material. Shock absorbing material includes shock absorbing foams, plastics, rubbers, and other material capable of absorbing shock.

A method of generating a contributor list is also provided. A plurality of contributors, e.g. 1, 2, . . . N, enter card information, associated numerical contribution amounts, or a combination thereof, into terminal 100 as described above. Terminal 100 stores the contribution transaction as described above. The contribution transactions include, information such as the names of each respective contributor, an account number for each respective contributor, and a corresponding numerical contribution monetary amount for each respective contributor. The contribution transaction information is transmitted to a card account processor, a funds transferring network, a bank, or combination thereof for processing. Processing includes associating an address with the contribution transaction or portion thereof. The associated contribution transaction information and address information for each contributor is then grouped together. A hard copy of the grouped information is then printed out, stored onto a computer disk, or forwarded to a fund-raising organization via a communication link to a database. It will be appreciated that a list prepared by the method described above can be used by a fund-raising organization for the subsequent solicitation of contributors. In a variant, the information is entered on terminal 100 subsequent to the contribution transaction.

The method described above may also include an authorization step whereby a contributor approves the provision of his address and other personal information for entry on a list, e.g. income information, age information, and other data which can be used for market research. The method described above may also include a step of associating the contributor's card information, contribution information, or combination thereof, with other market research data, e.g. age of contributor, income level of contributor, and other normally obtained market research data. In this scenario terminal 100 may be a portable hand-held terminal as described.

The present invention provides a method of increasing the giving of contributions, a method of increasing the average size of a contribution given by an contributor, a method of increasing the average contribution given by an individual over a period of time, a method of increasing the contribution revenue of a fund-raising organization, a method of increasing the average contribution revenue of a fund-raising organization, and a method of increasing the average giving of a contributor to a single fund-raising organization, or to a plurality of fund-raising organizations. The methods described above include a contribution wherein the contribution is a fund-raising organization contribution, a political contribution, a religious organization contribution, a charitable contribution. The method steps are those as disclosed above.

The invention provides a method of minimizing the liability risk for a card account processor, and fund-raising organization associated with utilization of an off-line information bearing card terminal. The method includes the step of accepting an off-line information bearing card transaction. The transaction includes accepting a contribution made by use of information bearing card and a numerical contribution amount made to a fund-raising organization. The fund-raising organization is as described above and includes, by way of example, a charitable organization, a museum, a religious organization. The contribution transaction made by a contributor can result in an intangible psychological benefit to the contributor. The psychological benefit may be a religious benefit, a humanitarian benefit, and the like, e.g. the contributor feels that he is "doing a good" for society, humanity, another human being, the environment, and the like.

A method of decreasing the average number of chargebacks associated with a group of transactions is also provided. The transactions are made on an off-line terminal 100 that accepts transactions by use of information bearing card. The method includes the steps of gathering a plurality of contribution transactions into a batch through the use of an off-line information bearing card terminal. The contribution transaction comprising information from an information bearing card for a respective contributor and designated contribution amount information for a respective contributor. The contribution data are transmitted in batch for authorization to a card account processor. Unauthorized transactions are discarded and authorized transactions are settled or reconciled.

The present invention also provides a system for fund raising, increasing fund-raising revenue, or combination thereof. The system comprises a portable off-line fund-raising terminal 100 that allows a plurality of contributors to make contributions sequentially by use of each cardholder contributor's information bearing card. Terminal 100 is as described above.

The system includes an optional fund raiser's terminal 120 for accepting each respective contributor's correlated card information, numerical amount information, cause designation information, designation of tax deductibility of contribution, or combination thereof. Terminal 120 post processes this information.

The system includes an optional communication link for downloading correlated card information for a respective contributor, numerical amount information for a respective contributor, cause designation information, or combination thereof, to a fund-raiser's terminal.

The system also includes optional card processing services for routing card transaction information, and an account product for storing post processed contributions. The account product includes, e.g. a bank account. The system also includes the methods disclosed herein.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A method of simplifying and inducing the giving of monetary contributions by contributors, receiving and immediately recording thereof upon receipt comprising, providing the contributors making monetary contributions with a portable, hand-held terminal for making of record information of respective contributions, said terminal having its own source of electric power and a plurality of entry keys manually operable for entering a numerical amount of the monetary contribution given, a reader on said terminal for reading a card record having indicia thereon identifying the contributor making the monetary contribution, the terminal having means for visual display of the monetary amount entered by manual operation of entry keys, and the terminal having means for recording the numerical amount of the contribution including means for storing numerical information of the monetary amount given correlated to the indicia read on said card record of the corresponding contributor, and said correlated amount and indicia read by said reader for eventual off-loading thereof by off-loading means.

2. The method of claim 1 in which said monetary contribution is a political contribution.

3. The method of claim 1 in which said monetary contribution is a charitable contribution.

4. The method of claim 1 in which said monetary contribution is a religious contribution.

5. The method of claim 1 in which said monetary contribution is a contribution to a fund-raising organization further comprising the step of circulating among said contributors a plurality of said portable, hand-held terminals for making of contribution transactions thereon.

6. A portable, hand-held contribution collection device passable manually from one contributor to another contributor comprising:
   an electrical energy powered contributions management terminal, said terminal having a battery electrical energy source;
   said terminal having a plurality of manually activated entry keys for designating numerically monetary amounts of respective monetary contributions made by respective contributors;
   a card processor on said terminal having a card reader for reading indicia on a card record medium identifying a respective contributor making a corresponding contribution using a respective card record medium for identification of the contributor;
   means responsive to activation of said entry keys for recording information corresponding to designated numerical amounts of monetary contributions made by corresponding contributors identified individually by indicia of a respective card record medium;
   means for automatically storing information recorded of the numerical amounts of individual designated monetary contributions correlated to the indicia read on said card record medium corresponding to a respective contributor for identification of the contributor, and said information recorded for eventual off-loading thereof by off-loading means.

7. A method of simplifying and inducing the giving of monetary contributions by individuals, receiving and immediately recording thereof upon receipt comprising,
   providing individuals for making of monetary contributions with a portable, hand-held terminal for making of record information of a contribution, said terminal having its own source of electric power and a plurality of entry keys manually operable for entering the numerical information of a voluntary amount of a monetary contribution given, said terminal having a case dimensioned for being held in the palm of an individual's hand, a reader on said terminal for reading a record medium having indicia thereon identifying an individual contributor making a given monetary contribution, the terminal having means for visual display of the amount entered by manual operation of entry keys, and the terminal having means for recording a voluntary amount of the contribution including means for storing the numerical information of the monetary amount correlated to the indicia read on said record medium of the corresponding contributor, and said correlated amount and indicia read by said reader for eventual off-loading thereof by off-loading means.

8. A method of simplifying the substantiation of a charitable contribution deduction, comprising the steps of,
   providing a contributor making a monetary contribution with a hand-held, portable terminal for making of record information on a contribution transaction, said terminal having its own source of electric power and a plurality of entry keys manually operable for entering a voluntary amount of the contribution to be given, a reader on said terminal for reading a record having indicia thereon identifying the contributor giving the monetary contribution, the terminal having means for visual display of the amount entered by manual operation of entry keys, and the terminal having means for recording the voluntary amount of the contribution including means for storing an amount correlated to the indicia read on said record of the corresponding contributor, said correlated amount and indicia read by said reader for eventual off-loading thereof by off-loading means,
   retrieving said information of the transaction from said portable terminal by retrieval means,
   processing said retrieved information of the transaction, and
   forwarding a record of said processed information of the transaction to said corresponding contributor.

9. The method of claim 8, further comprising the step of associating said information of the contribution transaction with a mailing address of said contributor, and wherein forwarding a record of said processed information to said contributor comprises the step of mailing a record of said processed information of the contribution transaction to said corresponding contributor.

10. The method of claim 8, in which forwarding a record of said processed contribution information to said corresponding contributor comprises the step of electronically forwarding a record of said processed information of the transaction to said respective contributor.

11. The method of claim 8, in which forwarding a record of said processed information to said respective contributor comprises the step of electronically forwarding a record of said processed information of the contribution transaction to a fund-raising organization, said fund-raising organization forwarding a record of said contribution transaction to said contributor.

12. The method of claim 8, wherein said charitable contribution is a contribution made to a religious organization.

13. The method of claim 8 further comprising the step of forwarding a record of said processed information of the transaction to a tax processing governmental body.

14. A method of simplifying the processing of a plurality of monetary transactions, receiving and immediately recording thereof upon receipt comprising,
   passing from one individual making a monetary transaction to another individual making a monetary transaction a portable, hand-held device for making of record information of respective successive monetary transactions, said device having its own source of power, a routine for making of record the successive monetary transactions and a plurality of entry operators manually operable for entering a numerical amount of the monetary transaction made, a reader on said device for reading a card record having indicia thereon identifying the individual making the monetary transaction, the device having means for visual display of the monetary amount entered by manual operation of entry keys, and the device having means for recording the numerical amount of the monetary transaction including means for storing numerical information of the monetary amount entered correlated to the indicia read on said record of the corresponding individuals.

15. The method in accordance with claim 14 in which said monetary transactions are recorded free of interruption by verification of authorization between a plurality of successive monetary transactions.

16. The method in accordance with claim 14 further comprising the step of optionally depositing cash or a check into a container being passed from one individual to another individual.

17. The method in accordance with claim 14 further including the step of post-processing a plurality of monetary transactions recorded on said device.

18. The method in accordance with claim 14 further including the step of conserving electrical energy usage of said device between a plurality of monetary transactions.

19. A monetary transaction processing device for receiving and immediately recording monetary transactions comprising, a portable, hand-held housing of a size and shape for holding said housing in a user's hand and passing said device from one user to another user, said device having circuitry and a routine for making of record information of respective successive monetary transactions free of verification of authorization of a plurality of monetary transactions and free of product or service information inputs, said device having its own source of power, and a plurality of entry operators manually operable for entering a numerical amount of the monetary transaction made, a reader on said device for reading a card record having indicia thereon identifying the individual making the monetary transaction, the device having means for visual display of the monetary amount entered by manual operation of entry keys, and the device having means for recording the numerical amount of the monetary transaction including means for storing numerical information of the monetary amount entered correlated to the indicia read on said record of the corresponding individuals.

20. A method of simplifying the processing of monetary transactions, receiving and immediately recording thereof upon receipt comprising, passing from one individual making a monetary transaction to another individual making a monetary transaction a portable, hand-held device for making of record information of respective successive monetary transactions, said device having its own source of power, a routine for making of record the successive monetary transactions free of product or service inputs, and a plurality of entry operators manually operable for entering a numerical amount of the monetary transaction made, a reader on said device for reading a card record having indicia thereon identifying the individual making the monetary transaction, and the device having means for recording the numerical amount of the monetary transaction including means for storing numerical information of the monetary amount entered correlated to the indicia read on said record of the corresponding individuals.

21. The method in accordance with claim 20 in which respective monetary transactions are correlated to causes designated by individuals making said monetary transactions.

22. The method in accordance with claim 20 further comprising the step of generating a list of individuals inputing said monetary transactions on said hand held device.

23. A method of decreasing the average number of chargebacks for a group of monetary transactions, comprising, providing an off-line, portable, device for making of record information of respective successive monetary transactions free off product or service inputs, said device having its own source of power, a routine for making of record the successive monetary transactions free of product or service inputs, and a plurality of entry operators manually operable for entering a numerical amount of the monetary transaction made, a reader on said device for reading a card record having indicia thereon identifying the individual making the monetary transaction, and the device having means for recording the numerical amount of the monetary transaction including means for storing numerical information of the monetary amount entered correlated to the indicia read on said record of the corresponding individuals.

\* \* \* \* \*